United States Patent
Lavchiev

(10) Patent No.: US 12,306,100 B2
(45) Date of Patent: May 20, 2025

(54) MEASUREMENT SYSTEM AND METHOD FOR OBTAINING INFORMATION ABOUT A SAMPLE

(71) Applicant: LAVCHIEFF Analytics GmbH, Gallneukirchen (AT)

(72) Inventor: Ventsislav Lavchiev, Gallneukirchen (AT)

(73) Assignee: LAVCHIEFF Analytics GmbH, Gallneukirchen (AT)

( * ) Notice: Subject to any disclaimer, the term of this patent is extended or adjusted under 35 U.S.C. 154(b) by 483 days.

(21) Appl. No.: 17/818,622

(22) Filed: Aug. 9, 2022

(65) Prior Publication Data
US 2022/0381689 A1   Dec. 1, 2022

Related U.S. Application Data

(63) Continuation of application No. PCT/EP2020/053337, filed on Feb. 10, 2020.

(51) Int. Cl.
*G01N 21/63* (2006.01)
*G01N 21/55* (2014.01)
(Continued)

(52) U.S. Cl.
CPC ......... *G01N 21/636* (2013.01); *G01N 21/554* (2013.01); *G01N 23/2251* (2013.01);
(Continued)

(58) Field of Classification Search
CPC .............. G01N 21/636; G01N 21/554; G01N 23/2251; G01N 2021/258; G01N 2201/0636

See application file for complete search history.

(56) References Cited

U.S. PATENT DOCUMENTS

2015/0177276 A1* 6/2015 Tachizaki .............. G01Q 60/22
850/30
2017/0167977 A1* 6/2017 Rivera .................... G01N 21/64
(Continued)

FOREIGN PATENT DOCUMENTS

WO    2019122161 A1    6/2019

OTHER PUBLICATIONS

Bouhelier, Wiederrecht, Opt. Left. 30, 884 (2005).
(Continued)

*Primary Examiner* — Nicole M Ippolito
(74) *Attorney, Agent, or Firm* — PERKINS COIE LLP; Michael A. Glenn

(57) ABSTRACT

A measurement system for obtaining information about a sample comprises an excitation-beam source configured for irradiating the sample with an excitation-beam. The measurement system comprises a probe unit configured for exposing the sample to a probing radiation or a probing field, and a detection unit configured for obtaining a first information about an interaction of the probing radiation or the probing field with the sample, if a plasmon or plasmon-polariton was excited by the excitation-beam, and obtaining a second information about an interaction of the probing radiation of the probing field with the sample, if a plasmon or plasmon-polariton was not excited by the excitation-beam.

18 Claims, 22 Drawing Sheets

(51) Int. Cl.
*G01N 21/552* (2014.01)
*G01N 23/22* (2018.01)
*G01N 23/2251* (2018.01)
*G01N 21/25* (2006.01)

(52) U.S. Cl.
CPC ............. *G01N 2021/258* (2013.01); *G01N 2201/0636* (2013.01)

(56) References Cited

U.S. PATENT DOCUMENTS

2022/0260611 A1* 8/2022 Zhang ............... G01Q 20/04
2022/0268704 A1* 8/2022 Dionne ............... H01J 37/226

OTHER PUBLICATIONS

Barnes, et al., Surface plasmon subwavelength optics; Nature 424, 824.

Krehl, J., et al., "Spectral field mapping in plasmonic nanostructures with nanometer resolution", Nature Communications, vol. 9, No. 4207, Oct. 11, 2018, pp. 1-6, XP081420768.

Krenn, Aussenegg, Nanooptik mit metallischen Strukturen; Physik Journal 1, 39 (2002).

Meier, Stefan, Plasmonics: Fundamentals and Applications, Springer, 2007.

Raether, Heinz, Excitation of Plasmons and Interband Transitions by Electrons, Springer Tracts in Modern Physics, vol. 88, Springer Berlin 1980.

Raether, Heinz, Surface Plasmons on Smooth and Rough Surfaces and on Gratings, Springer Tracts in Modern Physics, vol. 111, Springer Berlin 1988.

Yariv, A., et al., Optical Waves in Crystals, John Wiley & Sons, 1983.

Zayats, A, et al., Journal of Optics A: Pure and Applied Optics 5, Near-field photonics: surface plasmon polaritons and localized surface plasmons; S16 (2003), overview article.

Zayats, A. V., et al., "Nano-optics of surface plasmon polaritons", Physics Reports, North-Holland, Amsterdam, NL, vol. 408, No. 3-4, Mar. 2005 (Mar. 2005), pp. 131-314, XP027752935.

* cited by examiner

MEASUREMENT SYSTEM AND METHOD FOR OBTAINING INFORMATION ABOUT A SAMPLE

CROSS-REFERENCE TO RELATED APPLICATIONS

This application is a continuation of copending International Application No. PCT/EP2020/053337, filed Feb. 10, 2020, which is incorporated herein by reference in its entirety.

Embodiments of the present disclosure relate to a measurement system and a method for obtaining information about a sample. In particular, embodiments of the present disclosure relate to a measurement system and a method for investigating plasmons, plasmon-polaritons, and structures and materials that support plasmons or plasmon-polaritons. Further embodiments relate to a measurement system and a method for obtaining information about structural properties, dielectric properties, guiding properties such as the ability to guide plasmons or plasmon-polaritons, or to support a propagation of plasmons or plasmon-polaritons. Embodiments of the present disclosure relate to complementary electron-laser spectroscopy. Further embodiments relate to electron-laser spectro-microscopy.

BACKGROUND OF THE INVENTION

Electronics drove the industrial progress in the $20^{th}$ century. In the last decades, the field of photonics evolved and developed correspondingly so that many devices and methods of electronics were replaced by their photonic equivalents. Thus, photonics is ground for technological progress. Looking further to the future, many devices and methods of photonics will be replaced by their analogues from plasmonics, or alternatively, devices will be able to use photonics and plasmonics simultaneously. Thus, plasmonics may be the technology of the future. A further development of technologies needs a next step of miniaturization of components like chips, transistors, interconnects, multiplexers, detectors, etc., as well as an enhanced computational power and processing speed and time. Photonics are scalable up to a characteristic structural size of about 1 µm. Light may not be used for data transfer and as a tool for characterization below this characteristic structural size. Photonic structures like waveguides, ring resonators, or photonic crystals may also function on this scale. The reason is the diffraction limit in an optical system which prohibits an occurrence of light phenomena below the limit of about 1 µm. Plasmonics enables a further miniaturization and an enhancement of processing time and speed. Devices of the next generation will use plasmons and plasmon-polaritons as processing units or for carrying information. However, devices based on plasmonics may not be characterized by common methods relying on light, such as conventional optical microscopy, m-line-spectroscopy or similar methods.

For the realization of technology based on plasmons or plasmon-polaritons, a profound knowledge about plasmons or plasmon-polaritons and about materials or structures supporting the plasmons or plasmon-polaritons is essential. Currently, basically two methods for investigating plasmonics exist. One of them is electronic energy loss spectroscopy (EELS), which measures the energy distribution of electrons after their interaction with a sample during which the electrons lost energy due to inelastic scattering. Another method for the investigation of plasmons relies on an optical excitation of surface plasmons (SP) and surface plasmon polaritons (SPP). Surface plasmons may be excited with light under certain conditions. Firstly, the energy (i.e. frequency) of light quanta should be in the regime of the energy of surface plasmon. Secondly, surface plasmons, whether in metals, in semiconductors or in insulators, exhibit a lower phase velocity than the velocity of light. Thus, the wave vector of the light and the surface plasmon do not match. The electromagnetic field of the surface plasmon possesses an evanescent component, which is normal to the surface at which the plasmon propagates. That is, the SP has a wave vector component perpendicular to the surface and this component is purely imaginary. So, coupling between an electromagnetic wave and surface plasmon may only occur, if all components of the wave vector, both parallel and perpendicular, are equal. In particular, the exciting wave may have to be an evanescent wave itself. Common methods to provide such an evanescent wave based on an electromagnetic radiation are the prism coupling according to Andreas Otto or Kretschmann. Alternatively, a coupling may be achieved by using a grating. The excitation of surface plasmons by light is also possible at local defects on the metal surface or at non periodic structures such as edges or line defects, although with a lower efficiency. Equivalent methods allow for a decoupling or conversation of surface plasmons into light.

Although, current methods allow for an excitation of plasmons by optical means or by an e-beam, their capability for providing a comprehensive analysis of plasmons and plasmon-polaritons and their properties is limited by their technological feasibility and physical limits.

SUMMARY

According to an embodiment, a measurement system for obtaining information about a sample may have: an excitation-beam source configured for irradiating the sample with an excitation-beam, a probe unit configured for exposing the sample to a probing radiation or a probing field, a detection unit configured for obtaining a first information about an interaction of the probing radiation or the probing field with the sample, if a plasmon or plasmon-polariton was excited by the excitation-beam, obtaining a second information about an interaction of the probing radiation or the probing field with the sample, if a plasmon or plasmon-polariton was not excited by the excitation-beam.

According to another embodiment, a method for obtaining an information about a sample may have the steps of: irradiating the sample with an excitation-beam, exposing the sample to a probing radiation or a probing field, obtaining a first information about an interaction of the probing radiation or the probing field with the sample, if a plasmon or plasmon-polariton was excited by the excitation-beam, obtaining a second information about an interaction of the probing radiation or the probing field with the sample, if a plasmon or plasmon-polariton was not excited by the excitation-beam.

An idea of the present disclosure is to combine an excitation-beam that is capable of exciting a plasmon in a sample supporting a plasmon, and a probing radiation or probing field for obtaining information about the sample by means of detecting an interaction of the probing radiation or probing field with the sample. As the interaction of the probing radiation or probing field with the sample may depend on a presence and/or a property of the plasmon or plasmon-polariton, information about the plasmon or plasmon-polariton or information about the sample relating to plasmons or plasmon-polaritons, such as an ability of the sample to support or guide plasmons or plasmon-polaritons, may be obtained from the interaction of the probing radiation or probing field with the sample without the probing radiation or probing field itself being capable of exciting a plasmon in the sample. Thus, a broad variety of probing radiations or probing fields may be chosen, allowing examples of the disclosure being configured for obtaining information about one or more of plasmonic properties, structural properties, topologic properties, dielectric properties, and guiding properties.

An embodiment provides a measurement system for obtaining information about a sample comprising an excitation-beam source configured for irradiating the sample with an excitation-beam. The measurement system further comprises a probe unit configured for exposing the sample to a probing radiation or a probing field, and a detection unit configured for obtaining a first information about an interaction of the probing radiation or the probing field with the sample, if a plasmon or plasmon-polariton was excited by the excitation-beam, and obtaining a second information about an interaction of the probing radiation of the probing field with the sample, if a plasmon or plasmon-polariton was not excited by the excitation-beam.

Thus, the detection unit may be configured for obtaining information about an interaction of the probing radiation or the probing field in dependence on an excitation of a plasmon. From the information about the interaction the information about the sample, e.g. a plasmon/-polariton in the sample, may be obtained. The information about the sample may comprise or may allow inferring information about dielectric properties, an ability to support plasmons and/or plasmon-polaritons, structural properties, such as a presence of defects, or a surface roughness, and/or guiding properties, e.g. the ability to guide plasmons or plasmon-polaritons or to support propagating plasmons or plasmon-polaritons. The type of information about the sample may depend on a choice of the probing radiation or the probing field and/or the excitation-beam. Thus, the probing radiation or the probing field may be chosen in dependence on requirements of the sample and/or in accordance to the information about the sample that is to be obtained. As the measurement system may obtain the manifold information about the sample in dependence on an excitation of a plasmon/-polariton, information about the sample, e.g. structural or dielectric properties may be linked to plasmonic properties. Thus, the measurement system facilitates comprehensive investigation and analysis of the nature of plasmons or plasmon-polaritons in a broad range of plasmonic or photonic-plasmonic materials or structures.

Due to the possibility to choose a suitable probing field or probing radiation, physical properties and phenomena may be measured with a high precision and validity. Further, these properties and phenomena may be measured directly without being derived from theoretical models. Therefore, the measurement system may be applied for both fundamental research as well as for research and development. By decoupling the probing from the excitation of the plasmon or the plasmon-polariton, new physical and technical phenomena may be investigated. For example, the measurement system may enable investigations of new phenomena in photonics, plasmonics and nanophotonics. Further, as the detection unit is configured for obtaining the first information about the interaction if the plasmon or plasmon-polariton was excited, and for obtaining the second information about the interaction, if the plasmon or plasmon-polariton was not excited, a signal of the plasmon or plasmon-polariton may be easily identified or differentiated from other signals. A measurement system may be easily added to existing devices, for example to an electron-laser spectromicroscopy (ELSOM) device. In turn, the measurement system may be extended by further function and analysis techniques. Also, the measurement system may be used as a regular tool for optical or electron spectroscopy.

It is pointed out that the term plasmon includes both, surface plasmons and bulk or volume plasmons, as well as the term plasmon-polariton may equally refer to surface plasmon-polaritons. For increasing the intelligibility, the term plasmon/-polariton may be used to refer to plasmons and/or plasmon-polaritons. An information about an interaction of the probing radiation or the probing field and the sample, e.g. the first or the second information, may be referred to as an information about the interaction.

Adapting the excitation-beam and/or the probing beam or the probing radiation according to the sample may facilitate obtaining information about samples with various structural or electronic properties, for example metallic, semi-conducting or isolating samples having bulky, planar or low dimensional structures.

According to an embodiment, the excitation-beam source is configured for irradiating the sample with the excitation-beam so as to excite a plasmon/-polariton in the sample. Thus, information about the plasmon/-polariton may be obtained from an interaction of the probing radiation or probing field with the sample.

According to an embodiment, the excitation-beam source comprises an e-beam (e-beam) source configured for irradiating the sample with an e-beam. Using an e-beam as excitation-beam may enable an excitation of surfaces plasmon/-polaritons, and bulk plasmon/-polaritons. Further, the e-beam may be capable of irradiating samples of various surface structures.

According to an embodiment, the excitation-beam comprises an electromagnetic radiation, and the excitation-beam source is configured for irradiating a coupling element arranged adjacent to the sample so as to irradiate the sample with the excitation-beam. For example, the coupling element may rely on an Otto or Kretschmann configuration, may comprise a grating, a high aperture objective or other means for matching a wave vector of the electromagnetic radiation to a wave vector of a plasmon/-polariton, or the coupling element may be capable of coupling the electromagnetic radiation to a near field of the plasmon/-polariton. By irradiating the coupling element adjacent to the sample with electromagnetic radiation, surface plasmon/-polaritons may be excited in the sample. Using electromagnetic radiation for irradiating the sample may be a very gentle method to excite plasmon/-polaritons in the sample.

According to an embodiment, the measurement system is configured for simultaneously irradiating the sample with the excitation-beam and exposing the sample to the probing radiation or the probing field. Thus, the measurement system may be capable of obtaining the information about the interaction in dependence on the irradiation of the sample with the excitation-beam, for example in dependence on an excitation of a plasmon/-polariton in the sample.

According to an embodiment, the measurement system further comprises an analyzer configured to obtain the information about the sample based on an information about an interaction of the probing radiation or the probing field with the sample, e.g. based on the first or the second information about the interaction. For example, the analyzer may evaluate the information about the interaction. Thus, the analyzer may compare information about the interaction gathered at different instances of time and/or for different parameters of the excitation-beam and/or the probing radiation or the probing field.

According to an embodiment, the excitation-beam is configured for exciting the sample from a ground state to an excited state. Further, the detection unit is configured for obtaining the first information about an interaction of the probing radiation or the probing field with the sample while the sample is in the excited state, and the second information about an interaction of the probing radiation or the probing field with the sample while the sample is in the ground state. Further, the analyzer is configured for comparing the first information to the second information to obtain the information about the sample. In other words, by comparing the first information to the second information, a part of the first information that depends on whether the sample is in the excited state or in the ground state may be differentiated from a part of the first information that does not depend on whether the sample is in the excited state or in the ground state. Thus, the information about the sample may be obtained more precisely. For example, the first information about the interaction may be obtained during a time where the excitation-beam irradiates the sample, while the second information about the interaction may be obtained during a time during where the excitation-beam does not irradiate the sample or has not irradiated the sample for a time determined by a relaxation time of the sample.

According to an embodiment, the measurement system is configured for adapting a position of an excitation spot and/or a detection spot relatively to the sample. The excitation spot is a surface region of the sample which is to be irradiated with the excitation-beam. The detection spot is a surface region of the sample which is to be exposed to the probing radiation or the probing field. Further, the detection unit is configured for obtaining the information about the interaction in dependence on the position of the excitation spot and/or the detection spot. For example, the measurement system may adapt either the position of the excitation spot or the position of the detection spot so as to obtain the information about an interaction in dependence on a relative position of the excitation spot and the detection spot. Also, the measurement system may adapt the position of the excitation spot and the position of the detection spot synchronously so as to obtain the information about an interaction in dependence on the position of the excitation spot and the detection spot relative to the sample. Obtaining the information about an interaction in dependence on a relative position of the excitation spot and the detection spot may yield an information about a spatial distribution of plasmon/-polaritons or a spatial form of a plasmon/-polariton or a spatial distribution of properties of the sample. For example, a damping constant of a plasmon/-polariton may be obtained. Obtaining the information about an interaction in dependence on the position of the excitation spot and the detection spot relative to the sample may, for example, yield information about a structure of the sample. For example, the sample may comprise structures, such as wave guides, resonators or wave guides, that support plasmon/-polaritons so that a plasmon/-polariton may be confined to a specific region of the sample. Also, the information about an interaction may depend on a distribution of defects or imperfections of the sample or a surface structure of the sample. For example, adapting the position of the excitation spot and/or the detection spot may yield a spatial map of the sample from which an image of the sample may be obtained, for example, an image comprising spatial information about plasmonic, dielectric, and/or structural properties of the sample, or spatial information about a plasmon/-polariton or a propagation of a plasmon/-polariton. For example, a 3D image of a plasmon/-polariton may be obtained.

According to an embodiment, the analyzer is configured for obtaining a spatial image of an excited plasmon/-polariton based on a plurality of measurements of an information about an interaction of the probing radiation or the probing field with the sample. The plurality of measurements of the information about the interaction is obtained from a plurality of relative positions of the excitation spot and the detection spot. A spatial image of a plasmon/-polariton may provide information about the plasmon/-polariton and/or a structure of the sample.

According to an embodiment, the measurement system comprises a manipulation field source configured for exposing the sample to an electromagnetic manipulation field, and the detection unit is configured for obtaining the information about an interaction of the probing radiation or the probing field with the sample in dependence on the manipulation field. Thus, the information about an interaction may yield information about an interaction between the manipulation field and an excited plasmon/-polariton, from which information about the plasmon/-polariton may be obtained. For example, the electromagnetic manipulation field may comprise a magnetic field a microwave or terahertz (THz) radiation. Thus, the measurement system may enable an investigation of magneto-plasmonic effects or a modification of a property of surface plasmon/-polaritons and/or bulk plasmon/-polaritons by applying an external magnetic field. For example, the measurement system may enable an investigation of spin-plasmon interaction.

According to an embodiment, the measurement system is configured for adapting an angle between the excitation-beam and a main surface region of the sample. By adapting an angle between the excitation-beam and the main surface region of the sample, a momentum of the excitation-beam with respect to the main surface region of the sample or with respect to a specific direction in the sample may be adapted, for example, so as to match a plasmon/-polariton resonance in the sample. For example, adapting the angle between the excitation-beam and the main surface region may enable a measurement of a dispersion relation of a plasmon/-polariton in the sample.

According to an embodiment, the probing radiation or the probing field comprises one of an electromagnetic radiation (e.g. light, microwave radiation or THz radiation), an electromagnetic field (e.g. a magnetic field), an electrostatic field, or an e-beam (e.g. an additional e-beam to an e-beam of the excitation-beam). For example, an interaction between the electromagnetic radiation, for example an elastic or inelastic scattering or an absorption of the electromagnetic radiation, may depend on a presence and a property of a plasmon/-polariton. Further, the electromagnetic field may be disturbed or modified in dependence on a plasmon/-polariton so that the information about the interaction the sample may be obtained from the disturbance or the modification of the electromagnetic field. The electrostatic field may, for example, cause a tunnel current between the probe unit and the sample or an repulsion or attraction between the sample and the probe unit, which may depend on the presence or a property of a plasmon/-polariton. Electrons of the e-beam may be scattered by the sample. Having two e-beams for exciting and probing the sample allows for probing the sample with electrons of a different energy than the energy of the electrons exciting the sample. Further, the angles of the excitation e-beam and the probing e-beam with respect to the sample may be chosen independently. Each of these types of the probing radiation or probing fields may yield specific properties of a plasmon/-polariton or of the sample.

According to an embodiment, the measurement system comprises a photodetector configured for detecting a transmitted, reflected, emitted and/or scattered electromagnetic radiation from the sample. For example, a photodetector may be beneficially combined with the probing radiation comprising an electromagnetic radiation. For example, a transmission, reflection or scattering of the electromagnetic radiation by the sample may depend on the plasmon/-polariton and may further depend on parameters of the electromagnetic radiation, such as a polarization, an angle of incidence, an energy or an intensity of the electromagnetic radiation and may further depend on the sample itself. Also, the photo detector may detect electromagnetic radiation emitted by the sample, for example, due to an interaction of a plasmon/-polariton with an electromagnetic manipulation field such as a magnetic field.

According to an embodiment, the detection unit comprises a receiver unit configured for receiving an electromagnetic radiation or an electromagnetic field. The electromagnetic radiation or the electromagnetic field are based on electromagnetic radiation or an electromagnetic field emitted by the probe unit. For example, the receiver unit may be configured for receiving a microwave radiation, a THz radiation or a magnetic field. Thus, the measurement system may obtain information about an interaction between an electromagnetic radiation or an electromagnetic field with a plasmon/-polariton.

According to an embodiment, the detection unit is configured for detecting a modification of a magnetic field by the sample. For example, the detection unit may be configured for detecting a modification of the probing field 132 provided by the probe unit 130.

According to an embodiment, the measurement system comprises an electron detection unit which is configured for detecting electrons scattered and/or emitted by the sample. The electron detection unit allows for obtaining information about the sample by analyzing electrons of the excitation-beam scattered by the sample. Further, the electron detection unit may be advantageously combined with the feature of the probing radiation comprising an e-beam so that the electron detection unit may detect electrons of the probing radiation scattered by the sample. Thus, the excitation e-beam may excite a plasmon/-polariton in the sample, and the probing e-beam may obtain an information about the sample or about the excited plasmon/-polariton. The electron detection unit may be also be implemented independently from an e-beam. For example, the electron detection unit may allow for a detection of photoelectrons emitted by the sample, for example after an absorption of electromagnetic radiation.

According to an embodiment, the probe unit is configured for applying an electrostatic potential between a conductive tip and the sample for providing the probing field. The detection unit is configured for detecting a current, for example a tunneling current, between the conductive tip and the sample. By measuring a current between the conductive tip and the sample an electromagnetic field of the plasmon/-polariton may be determined. For example, the tip may be capable of obtaining the information about an interaction with a high spatial resolution.

A further embodiment provides a method for obtaining an information about a sample, the method comprising irradiating the sample with an excitation-beam, and exposing the sample to a probing radiation or a probing field. Further, the method comprises obtaining a first information about an interaction of the probing radiation or the probing field with a sample, if a plasmon/-polariton was excited by the excitation-beam, and obtaining a second information about an interaction of the probing radiation or the probing field with a sample, if a plasmon/-polariton was not excited by the excitation-beam.

The method relies on the same ideas and may comprise equal or equivalent features and functionalities as the measurement system for obtaining an information about a sample described before.

BRIEF DESCRIPTION OF THE DRAWINGS

Embodiments of the present invention will be detailed subsequently referring to the appended drawings, in which.

DETAILED DESCRIPTION OF THE INVENTION

In the following description, embodiments are discussed in detail, however, it should be appreciated that the embodiments provide many applicable concepts that can be embodied in a wide variety of spectroscopies. The specific embodiments discussed are merely illustrative of specific ways to implement and use the present concept, and do not limit the scope of the embodiments. In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments. In the following description, a plurality of details is set forth to provide a more thorough explanation of embodiments of the disclosure. However, it will be apparent to one skilled it the art that other embodiments may be practiced without these specific details. In other instances, well-known structures and devices are shown in block diagram form rather than in detail in order to avoid obscuring examples described herein. In addition, features of the different embodiments described herein may be combined with each other, unless specifically noted otherwise.

Figure 1:
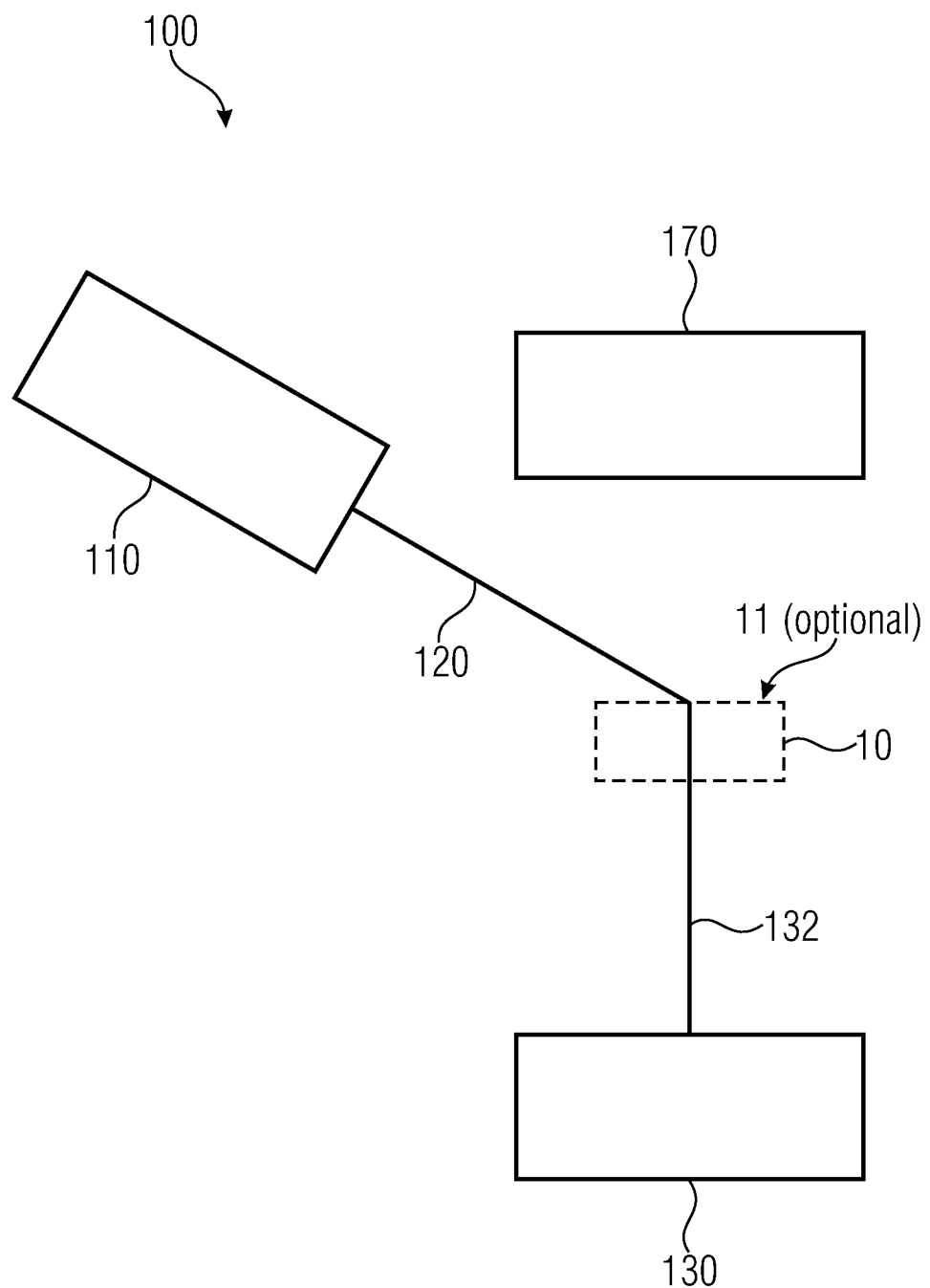
FIG. 1 shows a schematic representation of an example of a measurement system.

FIG. 1 shows a schematic representation of a measurement system for obtaining information about a sample 10 according to an embodiment. The measurement system 100 comprises an excitation-beam source 110 configured for irradiating the sample 10 with an excitation-beam 112. Further, the measurement system 100 comprises a probe unit 130 configured for exposing the sample to a probing radiation 132 or a probing field 132. The measurement system 100 further comprises a detection unit 170 configured for obtaining a first information about an interaction of the probing radiation 132 or the probing field 132 with a sample 10, if a plasmon/-polariton was excited by the excitation-beam 112. The detection unit 170 is further configured for obtaining a second information about an interaction of the probing radiation 132 or the probing field 132 with a sample 10, if a plasmon/-polariton was not excited by the excitation-beam 112.

It is pointed out that the illustrated arrangement of the excitation-beam source 110, the probe unit 130, and the detection unit 170 with respect to the sample 10 and with respect to each other is exemplary and may depend on an implementation of the respective features. In particular, the detection unit 170 may share components with the probe unit 130, for example, equivalent components may be used for providing the probing radiation 132 or the probing field 132 and for obtaining an information about an interaction of the probing radiation 132 or the probing field 132. The sample 10 may not be independent of the measurement system 100, but is an object to be investigated with the measurement setup 100.

For example, the sample 10 may have a main surface region 11. For example, the measurement system is configured for irradiating the main surface region 11 with the excitation-beam 112. For example, the excitation-beam 112 may excite a surface plasmon-polariton at the main surface region 11 of the sample 10. A capability of the excitation-beam 112 to excite a plasmon/-polariton in the sample 10 may depend on an energy of the excitation-beam 112, that is, for example an energy or a kinetic energy of particles or quanta of the excitation-beam 112. Further, the capability to excite a plasmon/-polariton may depend on a momentum of the excitation-beam 112, that is, a momentum of particles or quanta of the excitation-beam 112, with respect to a direction parallel to the main surface region 11 or with respect to a specific direction in the sample 10. Thus, the capability to excite a plasmon/-polariton may depend on an angle between the excitation-beam 112 and the main surface region 11 of the sample 10.

According to an embodiment, the measurement system 100 is configured for adapting an angle between the excitation-beam 112 and a main surface region 11 of the sample 10. For example, the angle may be adapted with a resolution of better than 0.1°, allowing for precise measurements of a dispersion relation of plasmon/-polaritons.

According to an embodiment, the measurement system 100 is configured for simultaneously irradiating the sample 10 with the excitation-beam 112 and exposing the sample 10 to the probing radiation 132 or the probing field 132. For example, the measurement system comprises means for arranging the sample 10 so that the sample or a specific surface region of the sample may be simultaneously irradiated with the excitation-beam 112 and exposed to the probing radiation 132 or the probing field 132.

According to an embodiment, the excitation-beam source 110 may be configured for irradiating the sample 10 with the excitation-beam 112 so as to excite a plasmon/-polariton in the sample 10.

For example, a combination of an energy and a momentum which are transferred from a particle or a quantum of the excitation-beam 112 to the sample 10, for example by inelastic scattering or by absorption, may match a dispersion relation of a plasmon/-polariton of the sample.

Figure 2:
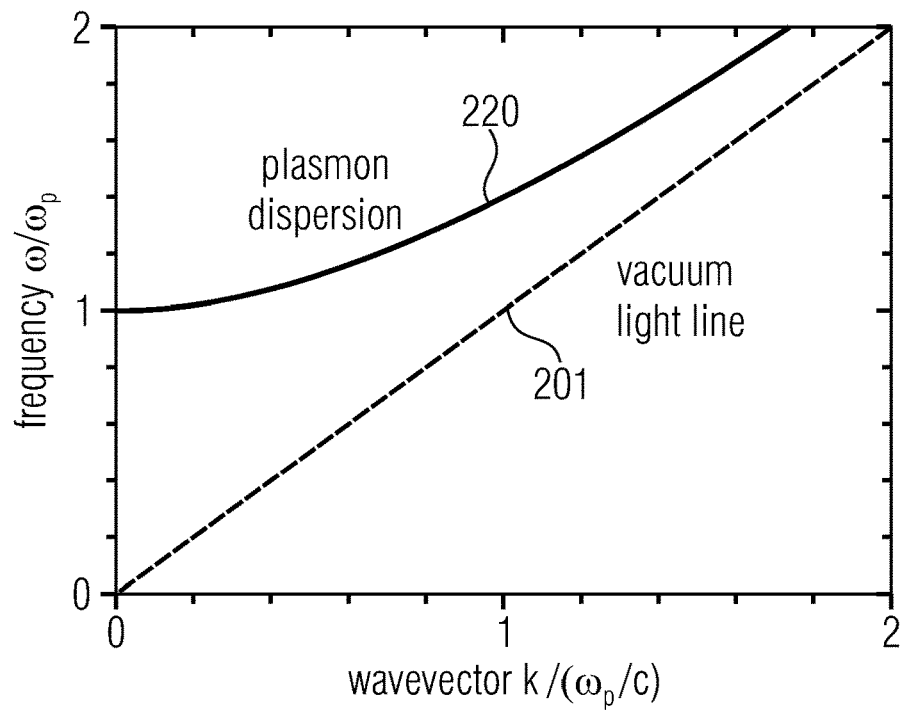
FIG. 2 shows a diagram with an exemplary dispersion relation of a bulk plasmon.
Figure 3:
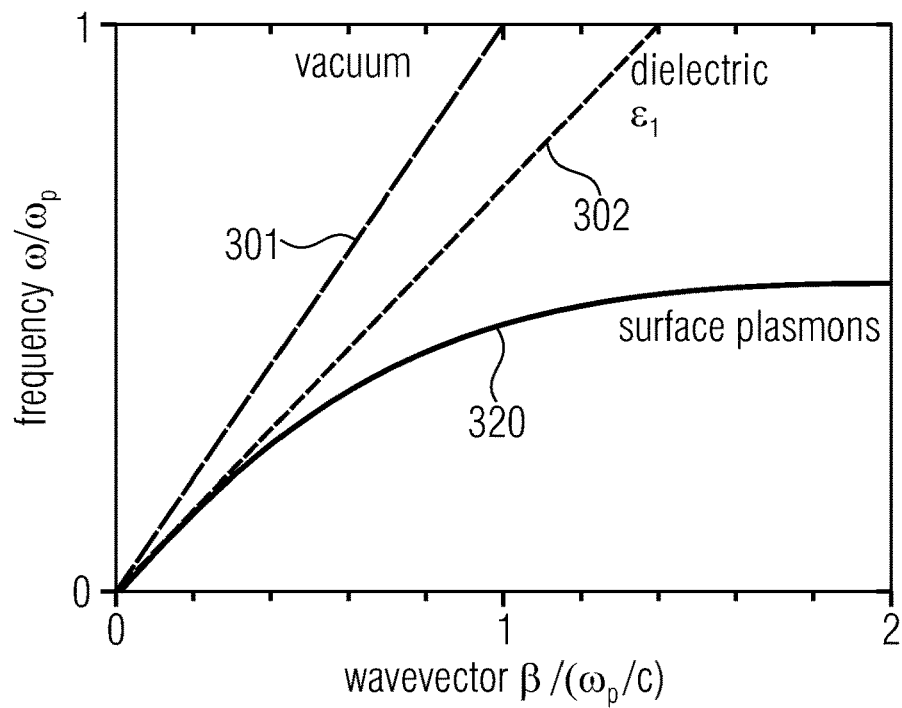
FIG. 3 shows a diagram with an exemplary dispersion relation of a surface plasmon-polariton.

FIGS. 2 and 3 show diagrams comprising dispersion relations, i.e. a correlation between an energy or frequency with respect to a momentum or wave vector. FIG. 2 comprises a dispersion relation 220 of a bulk plasmon/-polariton in comparison to a dispersion relation 201 of light propagating in vacuum. FIG. 3 comprises a dispersion relation 320 of a surface plasmon-polariton in comparison with a dispersion relation 301 for light propagating in vacuum and a dispersion relation 303 for light propagating in a dielectric material having the dielectric constant $\varepsilon_1$.

According to an embodiment, the excitation-beam source 110 comprises an e-beam source, configured for irradiating the sample 10 with an e-beam 112.

For example, the e-beam 112 may be adapted to the dispersion relation 220 of a bulk plasmon/-polariton or the dispersion relation 320 of a surface plasmon-polariton by adapting an angle between the e-beam 112 and the main surface region 11 of the sample 10 and/or by adapting an energy of the electrons of the e-beam 112. For example, by obtaining the information about the interaction of the probing radiation 132 or the probing field 132 with the sample 10 for various different angles or energies or polarization states, a dispersion relation 220, 320 of the plasmon/-polariton may be determined.

According to an embodiment, the excitation-beam 112 comprises an electromagnetic radiation, and the excitation-beam source 110 is configured for irradiating a coupling element arranged adjacent to the sample 10 so as to irradiate the sample 10 with the excitation-beam 112. The coupling element may enable an excitation of surface plasmon-polaritons by the electromagnetic radiation of the excitation-beam 112. For example, the excitation-beam source 110 comprises a radiation source for providing the electromagnetic radiation and may further comprise the coupling element.

Figure 4:
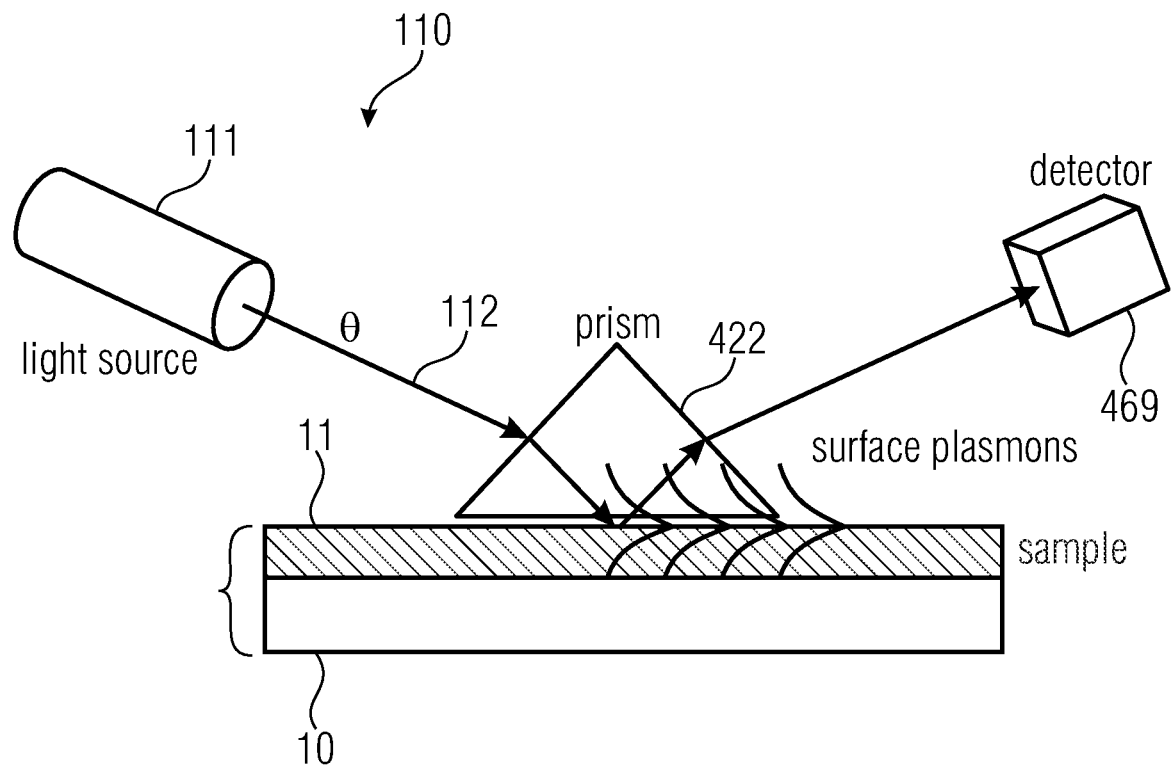
FIG. 4 illustrates an example of a prism serving as a coupling element.
Figure 5:
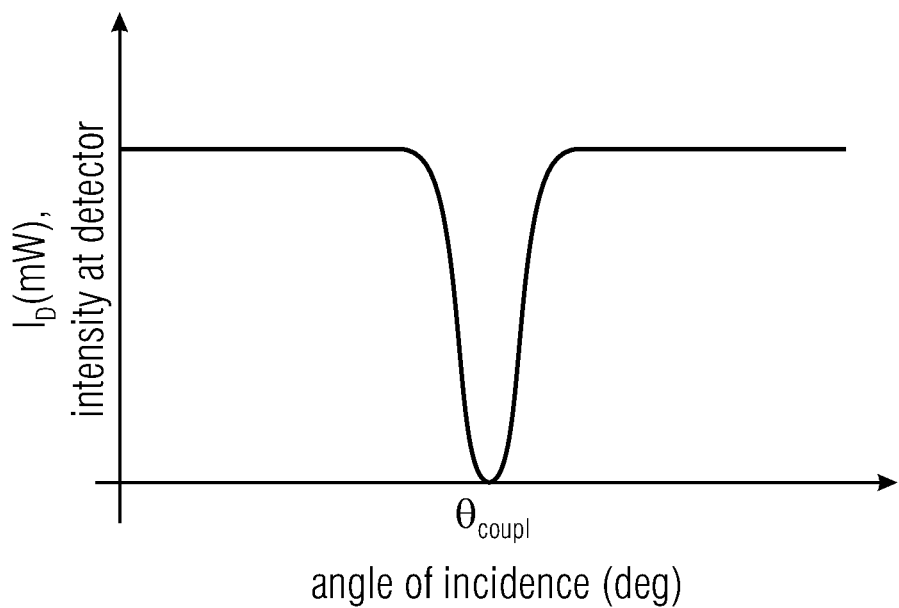
FIG. 5 shows a diagram comprising an example of a reflected intensity.

FIG. 4 illustrates an example of an excitation-beam source 111 with a prism 422 as the coupling element. The prism 422 is arranged adjacent to the main surface region 11 of the sample 10. The prism 422 may increase a momentum or a wave vector of the electromagnetic radiation 112. A total reflection of the electromagnetic radiation 112 at an interface between the prism 422 and the main surface region 11 may result in an evanescent wave which may be able to excite a surface plasmon-polariton in the sample 10. For example, an excitation of a surface plasmon-polariton may occur at a specific angle between the electromagnetic radiation 112 and the main surface region 11, and may result in a reduced reflection of the electromagnetic radiation 112 at the interface between the prism 422 and the main surface region 11. The reflection may be detected by a detector 469. FIG. 5 shows a diagram comprising an example of a reflected intensity of the electromagnetic radiation 112 in dependence on the angle of incident. The dip at the graph may be interpreted as a reduced reflection due to the coupling of the beam 112 into a SP/SPP, i.e. the energy of the incident beam 112 is transferred to an excited SP/SPP and there may be no reflected signal at this instance.

Figure 6:
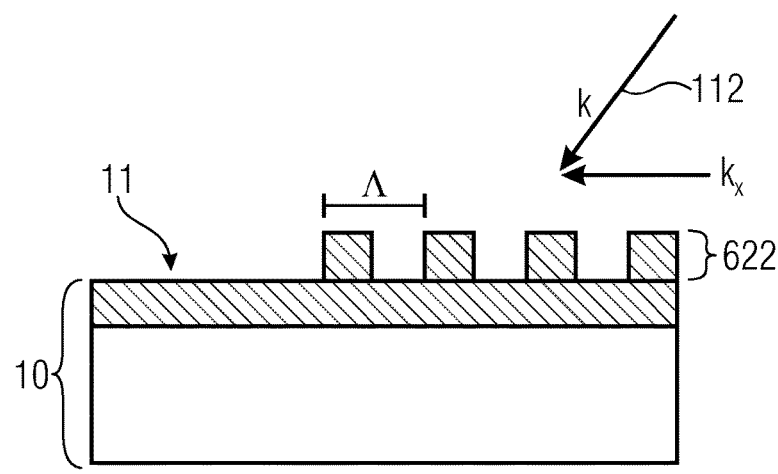
FIG. 6 illustrates an exemplary grating serving as a coupling element.

FIG. 6 illustrates an exemplary grating 622 as a further example of the coupling element. The grating 622 is arranged adjacent to the main surface region 11 of the sample 10. For exciting a surface plasmon-polariton at the main surface region 11 of the sample 10, it may be needed to match a component $k_x$ of the wave vector k of the electromagnetic radiation 112, which is parallel to the main surface region 11 to a dispersion relation 320 of a surface plasmon-polariton. For example, a period $\Lambda$ of the grating 622 may be adapted so that a sum of $k_x$ and the reciprocal of the period of the grating 622 may together provide for a wave vector that matches the dispersion relation of a surface plasmon.

Figure 7:
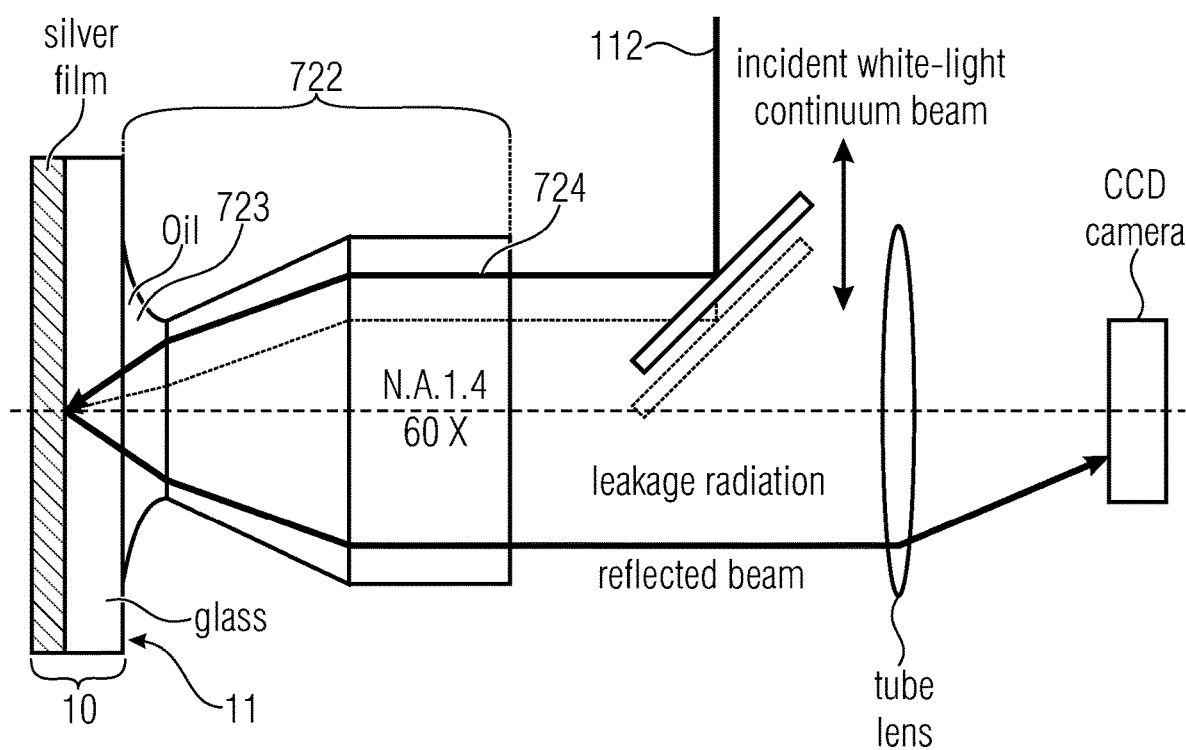
FIG. 7 illustrates an example of a high aperture objective as a coupling element.

FIG. 7 illustrates an example of a high aperture objective as a coupling element 722. The coupling element 722 further comprises an immersion layer 723 which is arranged adjacent to the main surface region 11 of the sample 10. The high aperture objective 724 is in contact with the immersion layer 723, so that the electromagnetic radiation 112 may pass through the objective 724 and the immersion layer 723 for irradiating the main surface region 11. An angle of incidence which may be provided by such an arrangement may allow for an excitation of a surface plasmon-polariton.

Figure 8:
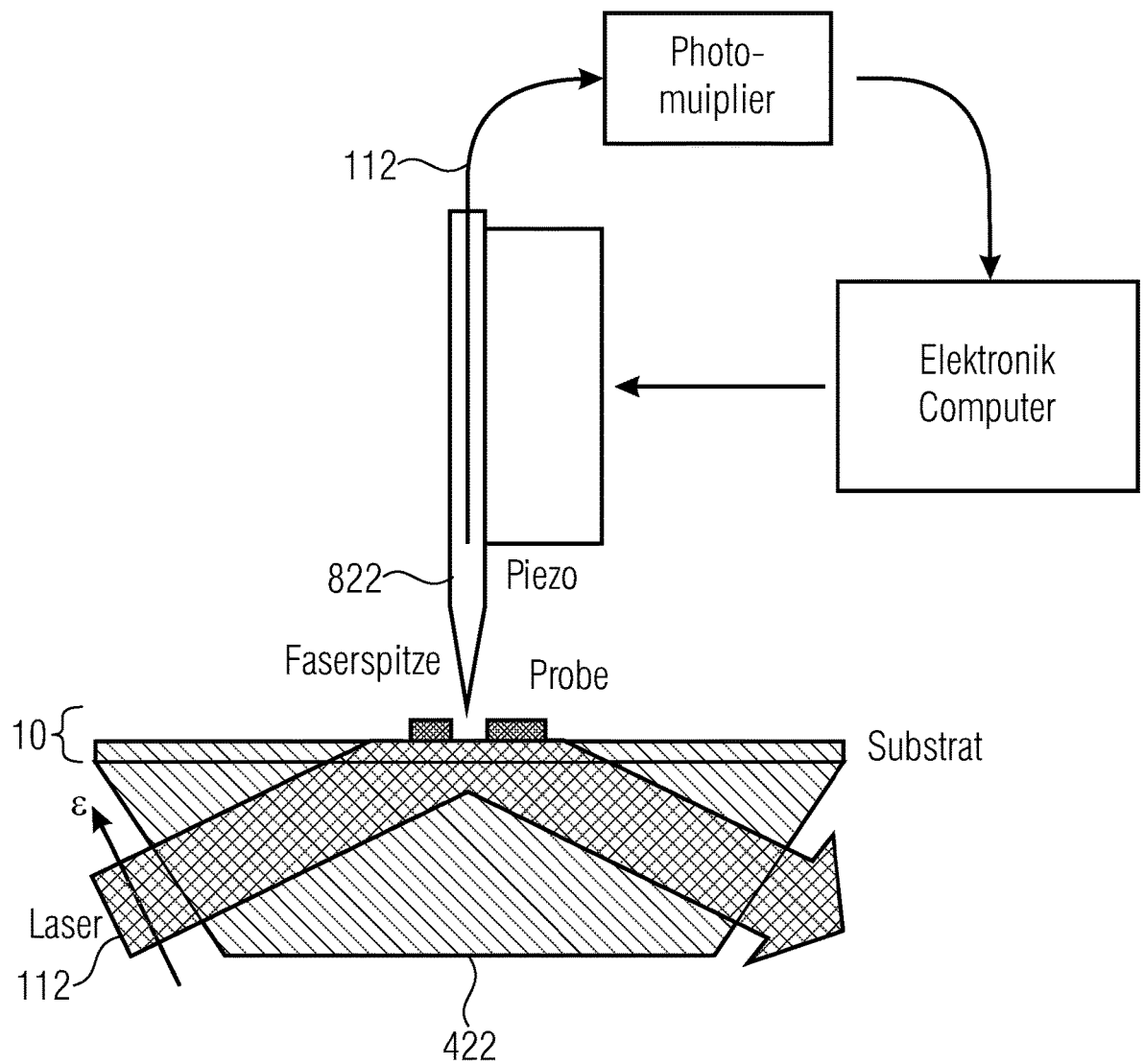
FIG. 8 illustrates a near field coupling according to an embodiment.

FIG. 8 illustrates a near field coupling as a coupling element 822 according to an embodiment. The representation in FIG. 8 comprises a prism 422 for irradiating the sample 10 with the electromagnetic radiation 112 and further comprises a fiber tip 822. For example, the fiber tip 822 may be moved across a surface region of the sample 10 in close proximity to the surface region of the sample 10, for example, within a distance that is lower than two times a wavelength of the electromagnetic radiation 112. The fiber tip 822 may couple to an electromagnetic radiation emitted by a surface plasmon-polariton in the sample. Equally, the fiber tip 822 may be used for irradiating the sample 10 with the electromagnetic radiation 112. Due to the close distance between the fiber tip 822 and the sample 10, the electromagnetic radiation 112 may excite a surface plasmon/-polariton in the sample 10 due to near field effects.

Figure 9:
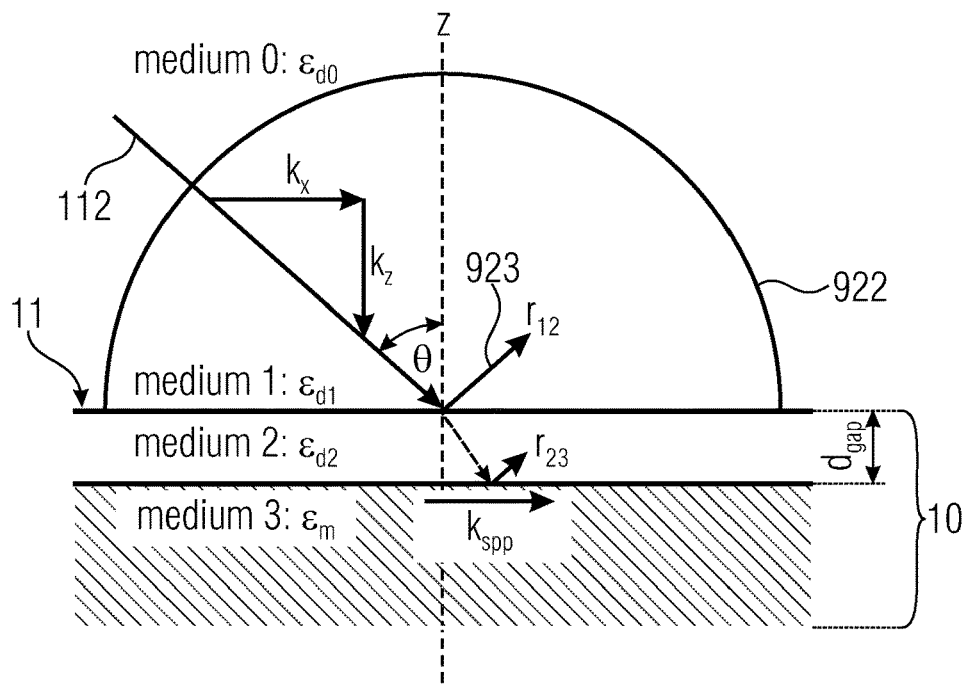
FIG. 9 illustrates an exemplary half cylinder serving as a coupling element.
Figure 10:
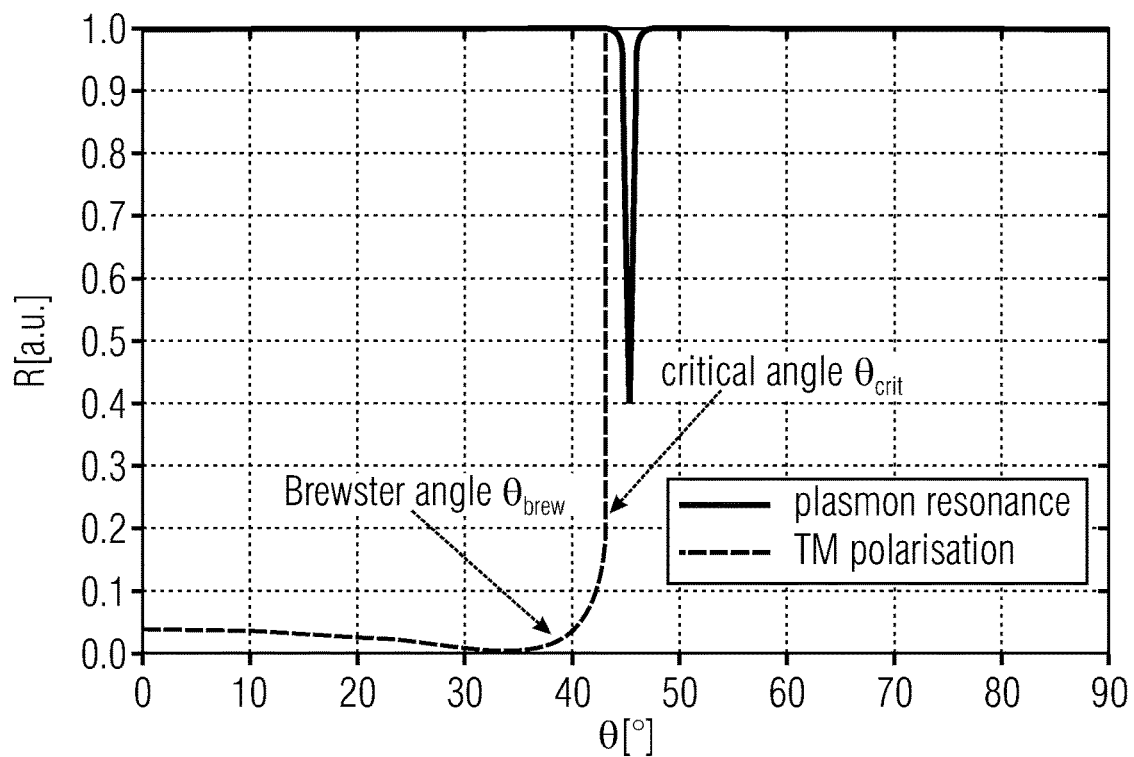
FIG. 10 shows a diagram comprising an example of a reflected intensity.

FIG. 9 illustrates a half cylinder as a coupling element 922 according to an embodiment. The half cylinder 922 is arranged adjacent to the main surface region 11 of the sample 10. Similarly, to the prism 422 described with respect to FIG. 4, an electromagnetic radiation 112 irradiating the main surface region 11 through the half cylinder 922 may couple to a surface plasmon-polariton in the sample 10 due to an evanescent wave at the interface between the half cylinder 922 and the main surface region 11. FIG. 10 shows a diagram comprising an exemplary intensity of a reflection 923 of the electromagnetic radiation 112 as shown in FIG. 9. Similarly, as described with respect to FIG. 5, the intensity of the reflection 923 may be small due to an excitation of a surface plasmon-polariton at the specific angle of incident.

Figure 11:
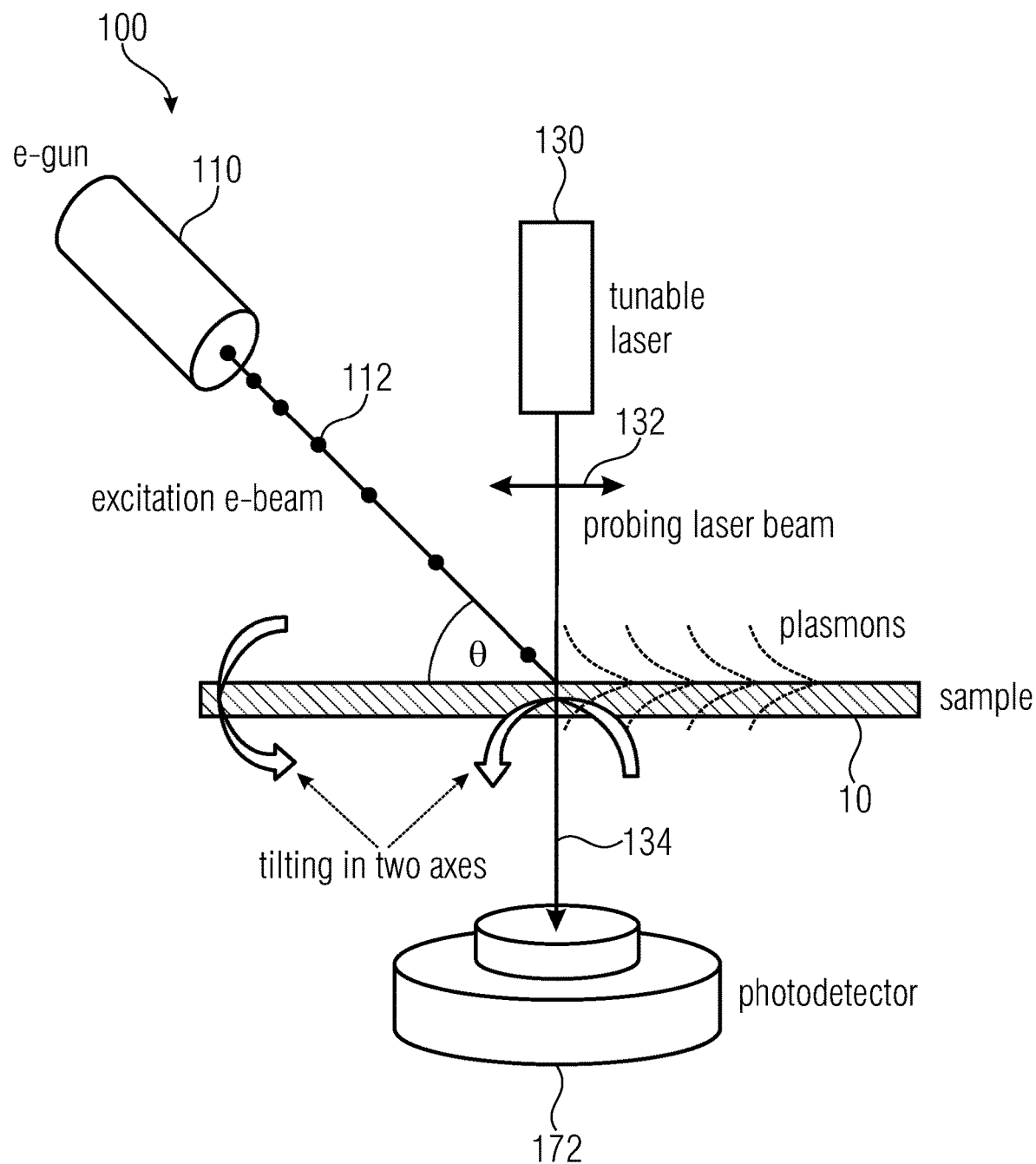
FIG. 11 illustrates another example of the measurement system.

FIG. 11 illustrates another example of the measurement system 100. According to this example, the probe unit 130 comprises an electromagnetic radiation source configured for exposing the sample 10 to the probing radiation 132, the probing radiation 132 comprising an electromagnetic radiation.

For example, the probing unit 130 may comprise a laser configured for providing the electromagnetic radiation 132 so that the electromagnetic radiation 132 has a wavelength within a specific range. The electromagnetic radiation 132 may be scattering elastically or inelastically by the sample 10 resulting in a scattered electromagnetic radiation 134. For example, the electromagnetic radiation 132 may be scattered inelastically by a plasmon/-polariton so that the scattered electromagnetic radiation 134 allows for inferring the information about the plasmon/-polariton.

Further possible interaction between the electromagnetic radiation 132 and the sample 10 may comprise absorption and recombination, for example band-to-band absorption, intersubband absorption, band-to-discreet-level absorption, or excitonic absorption and recombination. In particular, absorption and recombination may comprise absorption and recombination in 2D, 1D and 0D nanostructures. Further interaction between the electromagnetic radiation 132 and the sample 10 may comprise a photo elastic effect, a photo voltaic effect, a photo refractive effect, and a controlled emission, e.g. in micro cavities. Absorption and recombination processes or controlled emission may result in secondary radiation 134 emitted due to a recombination process. One or more of these effects may cause a noise signal, that is a signal that may superpose or obscure an information to be obtained. For example, these effects may contribute to the information about the interaction, but may in some cases not depend on a plasmon/-polariton. For example, an electromagnetic noise signal may be filtered by a spectral filter.

According to an embodiment, the probe unit 130 is configured for providing the electromagnetic radiation 132 in a specific polarization state, for example the electromagnetic radiation 132 may be linearly polarized or may be circularly polarized.

According to an embodiment, the measurement system comprises a photodetector 172 configured to detect a transmitted, reflected, emitted and/or scattered electromagnetic radiation 134 from the sample 10. The electromagnetic radiation 134 may result from a scattering of the electromagnetic radiation 132 or may result from an emission of electromagnetic radiation following an absorption of the electromagnetic radiation 132. Alternatively, the electromagnetic radiation 134 may originate from synchrotron radiation or Bremsstrahlung.

For example, the detection unit 170 comprises the photodetector 172 for obtaining the information about the interaction. However, in further examples, the photo detector 172 is an additional detection unit, providing additional information about the sample.

Although the photodetector 172 in FIG. 11 is arranged to detect transmitted electromagnetic radiation, other implementations enable a detection of reflected, scattered and/or emitted electromagnetic radiation 134 with different angles with respect to the sample 10. For example, for detecting reflected electromagnetic radiation, a beam splitting unit may be implemented. The detection angle may contribute to the information about the interaction. For example, an angle between a direction of the secondary radiation 134 and the sample 10 may depend on the specific recombination process.

The detection unit may include two photodetectors—one for angle-resolved experiments and another one for the measurements described here above. In addition, the detection unit may include also electron detector(s) for measurements of the electron energies, angles of scattering off the sample, flux etc.

According to an embodiment, the electromagnetic radiation source is a continuous wave source.

According to an alternative embodiment, the electromagnetic radiation source is a pulsed source. A pulsed source for the electromagnetic radiation source may allow for obtaining a time resolved information about the interaction of the electromagnetic radiation with the sample 10, for example by applying a pump-probe scheme, the excitation-beam serving as pump beam 112 and the probing radiation 132 serving as probe beam. From a time resolved information, a lifetime of an excited state of the sample 10 such as a plasmon/-polariton, may be determined. For example, a time resolution may be in the nanosecond, picosecond or femtosecond regime.

Thus, the measurement system 100 may enable an investigation of time-resolved plasmon/-polariton phenomena.

Accordingly, the excitation-beam source 110 may irradiate the sample with the excitation-beam 112 during a first time period and the probe unit 130 may expose the sample 10 to the electromagnetic radiation during a second time period. The measurement system 100 may obtain the information about the interaction of the electromagnetic radiation 132 and the sample 10 in dependence on a time delay between the first time period and the second time period allowing for obtaining time resolved information about the interaction and/or information about a lifetime of a plasmon/-polariton.

At the same time, measurements may also be provided when the excitation beam and the probing beam irradiate the sample simultaneously.

In other words, for example, an e-beam may be used for exciting bulk and surface plasmons/-polaritons in a material or a structure. Then, a beam of a tunable wavelength laser probes the material or the structure in the excited state in the presence of the created plasmon/-polariton. The interaction between the beam and the material and the excited state, for example the plasmon/-polariton, modifies the beam and the transmitted or reflected laser light may be analyzed in dependence on the geometry of the used experiment by a photodetector 172. A second reference measurement may be performed for the transmission or the reflection in absence of plasmons or plasmon-polaritons, that is during a time period in which the sample 10 is not irradiated by the e-beam 112. One or more properties of the detected laser light may be analyzed in dependence on its interaction with the polarization state of the plasmon/-polariton, the intensity of the reflected or transmitted light, an energy transfer of photons of the laser light to the plasmon/-polariton or vice versa, the scattering of the laser light, for example an angle of the analyzed light, or non-linear effects due to the interaction, also the polarization characteristics of the emitted light or the change of the polarization characteristics of the laser light. The analysis of these properties and effects may provide information about a presence and a property of plasmons or plasmon-polaritons, as well as about the material itself, as the property of the plasmon/-polaritons may be clearly connected to the material. In a pulsed regime of the tunable laser, for example on a first or second time scope, time resolved experience may be possible for determining a lifetime of the excited state. This concept may be applied to various structures, for example to planar layers such as 2D structures, 1D micro- and nanowires and nanotubes, nanocrystals and quantum dots, which are 0D structures, to 3D structures, for example 3D chips, photonic 3D crystals and meta materials, molecules, and various types of polymers, etc.

Figure 25:
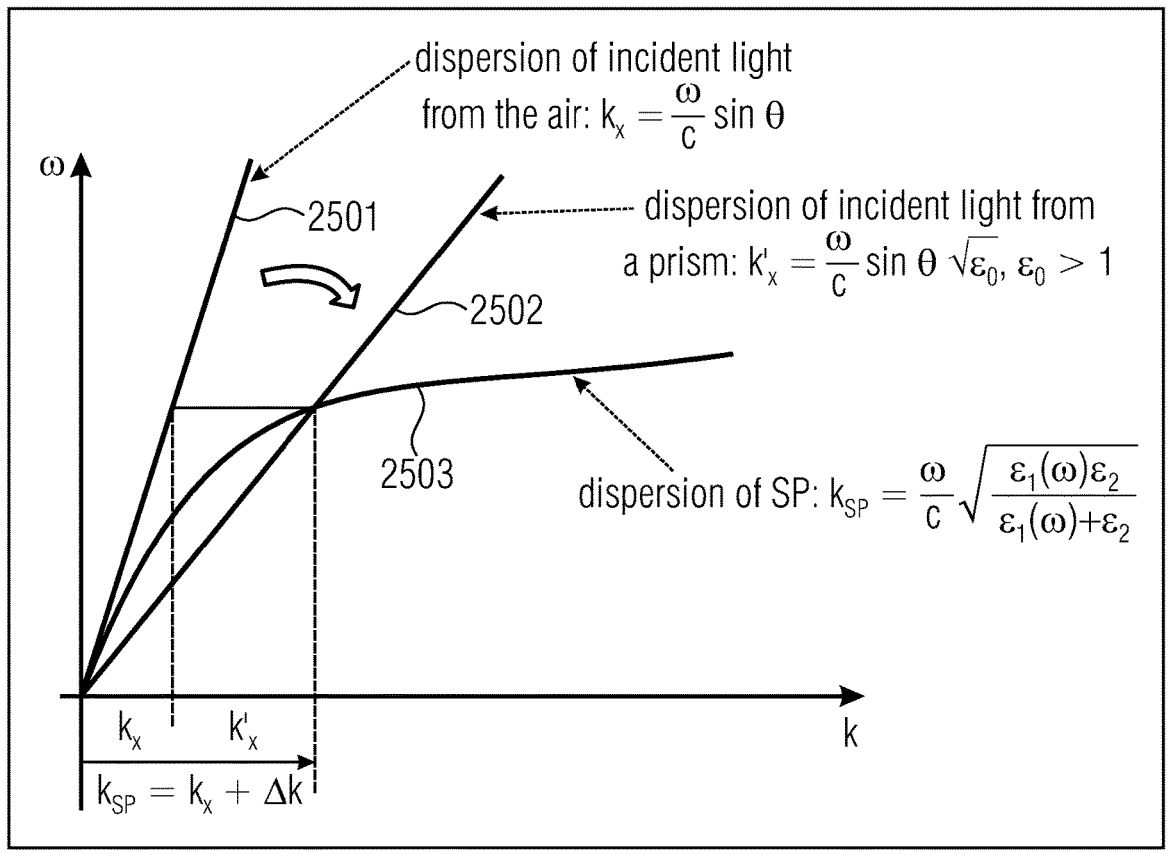
FIG. 25 shows an exemplary dispersion of a surface plasmon.
Figure 25:
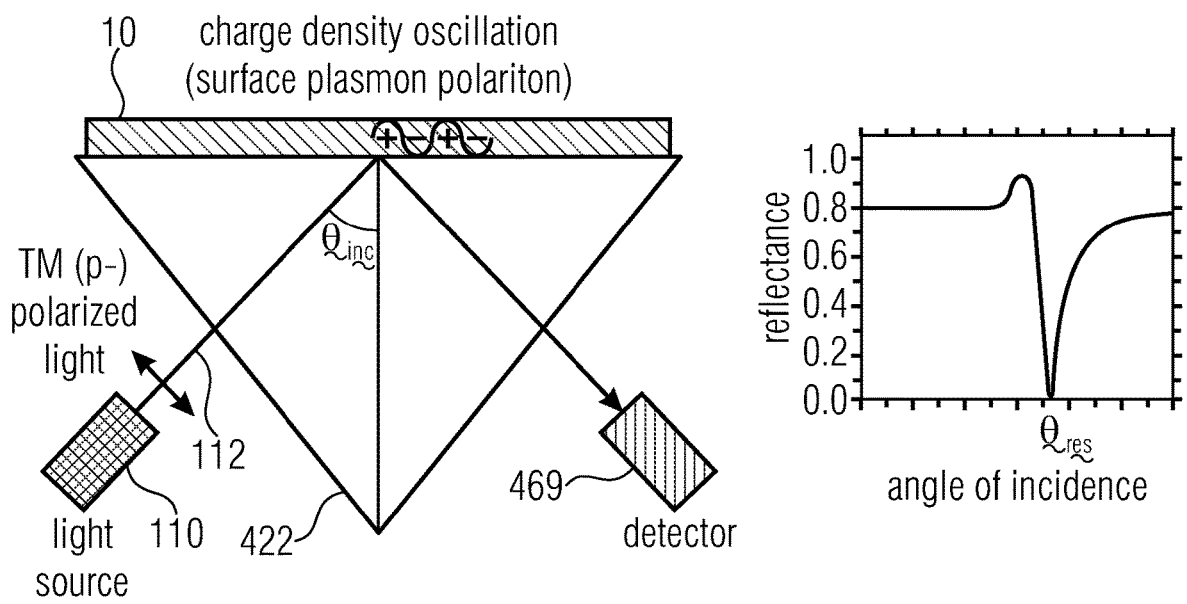

For example, the measurement system 100 according to FIG. 11 may be operated in a probing mode. In other words, in probing mode, an e-beam 112 may be used to excite bulk and surface plasmon/-polaritons in the material or structure. Then, a second beam 132 from a light source may scan the material/structure in the excited state i.e. in the presence of the generated plasmon/-polariton. The method may measure the light beam 134, e.g. $S_1(\lambda,t)$, after its interaction with the sample 10. The interaction between the light beam 132 and the material in the excited state (i.e. and the plasmon/-polariton) may modify the light beam 132 and then, depending on the geometry of the experiment used, the transmitted or reflected light 134 may be detected by a photodetector. A second measurement may be performed with the e-beam source switched off, thus in the absence of excited plasmon/-polaritons i.e. the signal $S_0(\lambda,t)$. This is the ground state of the material for the method. Then, the method may compare the signal at the photodetector in the presence $S_1(\lambda,t)$ of plasmon/-polaritons with the signal $S_0(\lambda,t)$ in the absence of plasmon/-polaritons. As a scanning beam, both non-polarized and polarized light may be applied. Since the plasmon/-polaritons in the material/structure may be polarized, the interactions of non-polarized photons or polarized photons with the plasmon/-polaritons may be researched. In the case of using a laser beam, it may be obviously interaction of linearly polarized light with plasmon/-polaritons. The laser beam may be continuous wave (cw) or pulsed. On the other hand, the beam may be of a fixed wavelength or from a tunable wavelength laser. This technique may be based on measurements of elastic and inelastic scattering of the photon (from the light beam) on the plasmon/-polariton. The strongest interaction of the photon with the plasmon/-polariton may be expected in the range of the resonance of the energy and wavevector of the plasmon/-polariton. The plasmon/-polariton energy, under the approximation that electrons are considered as electron plasma, may be estimated from the equation:

$$E_{pl} = \hbar \sqrt{\frac{n \cdot e^2}{m \cdot \varepsilon_0}}$$

n—the conduction electron density
e—the elementary charge
m—electron mass
$\varepsilon_0$—permittivity of free space
$\hbar$—the Planck constant On the other hand, the resonance of the plasmon's wave vector is shown in FIG. 25 and explained in the respective description. The most probable channel of elastic interaction may be coupling of the photon with the plasmon/-polariton, thus building a plasmon-polariton. The plasmon-polariton will propagate within the material with some characteristic propagation length (depending on the material, the plasmon-polariton energy and wave vector, the photon energy etc.), after which the plasmon-polariton degrades back to a plasmon and photon emission. This could be named an elastic scattering of a photon on a plasmon. In this interaction, the incident photon energy $E_{inc}=\hbar\omega_{inc}$ is equal to the energy of the output photon $E_{out}=\hbar\omega_{out}$ i.e. $E_{inc}=E_{out}$. Other channels of elastic scattering may also occur. For example, scattering without coupling (coupling takes place when equality of the wavevectors is obeyed i.e. $\vec{k}_{photon}=\vec{k}_{plasmon}$) Another possible channel of interaction is inelastic scattering of the photon on the plasmon. This process is related to loss of energy of the photon. This means, the incident photon interacts with the plasmon and loses part of its energy, the photon at the output thus has a different energy from that of the incident photon i.e. $E_{inc}\neq E_{out}$. This inelastic scattering of a photon on a plasmon may be a form of the Raman scattering: When a photon of energy $E_{ph}=\hbar\omega_{ph}$ is incident on a plasmon of energy $E_{plas}=\hbar\omega_{plas}$ then the output is a scattered photon of energy either $E_{ph\ 1}=\hbar\omega_{ph}-\hbar\omega_{plas}$ or $E_{ph\ 2}=\hbar\omega_{ph}+\hbar\omega_{plas}$. A different output channel might occur as well. For example: The incident photon of energy $E_{ph}=\hbar\omega_{ph}$ may transfer energy $\Delta E_{ph}=\Delta\hbar\omega_{ph}$ to the plasmon of energy $E_{plas}=\hbar\omega_{plas}$, the plasmon energy then becomes $E_{plas}=\hbar\omega_{plas}+\Delta\hbar\omega_{ph}$ and the output is a scattered photon of energy $\hbar\omega_{ph}-\Delta\hbar\omega_{ph}$. The plasmon can further emit the extra energy $\Delta\hbar\omega_{ph}$ as a phonon or as a photon.

The output measurements may measure and analyse several characteristics of the light beam as a function of its interaction with the plasmon/plasmon-polariton—polarization state of the output light, intensity of the reflected (or transmitted) signal, energy transfer from the photons to the plasmons/-polaritons and vice versa, scattering of the light, non-linear effects resulting from the interaction etc. The analysis of these characteristics and effects may provide information about the presence and the properties of the plasmons/-polaritons and about the material itself since the characteristics of the plasmon/plasmon-polariton can be uniquely associated with the material, in which the plasmon/plasmon-polariton emerges. In a pulsed regime of the tunable laser (femtosecond time scale), time-resolved experiments are possible to measure the lifetime of the excited state. The method may be applied to various kinds of structures—planar layers (a 2D structure), 1D micro- and nano-wires and nanotubes, on nanocrystals (NCs) and quantum dots (QDs), which are 0D structures, on 3D structures such as 3D chips, 3D photonic crystals and metamaterials, molecules, numerous kinds of polymers etc.

For example, the probing mode is intended to examine the presence of plasmons, plasmon-polaritons along with other electron-related phenomena, and some material parameters.

Figure 12:
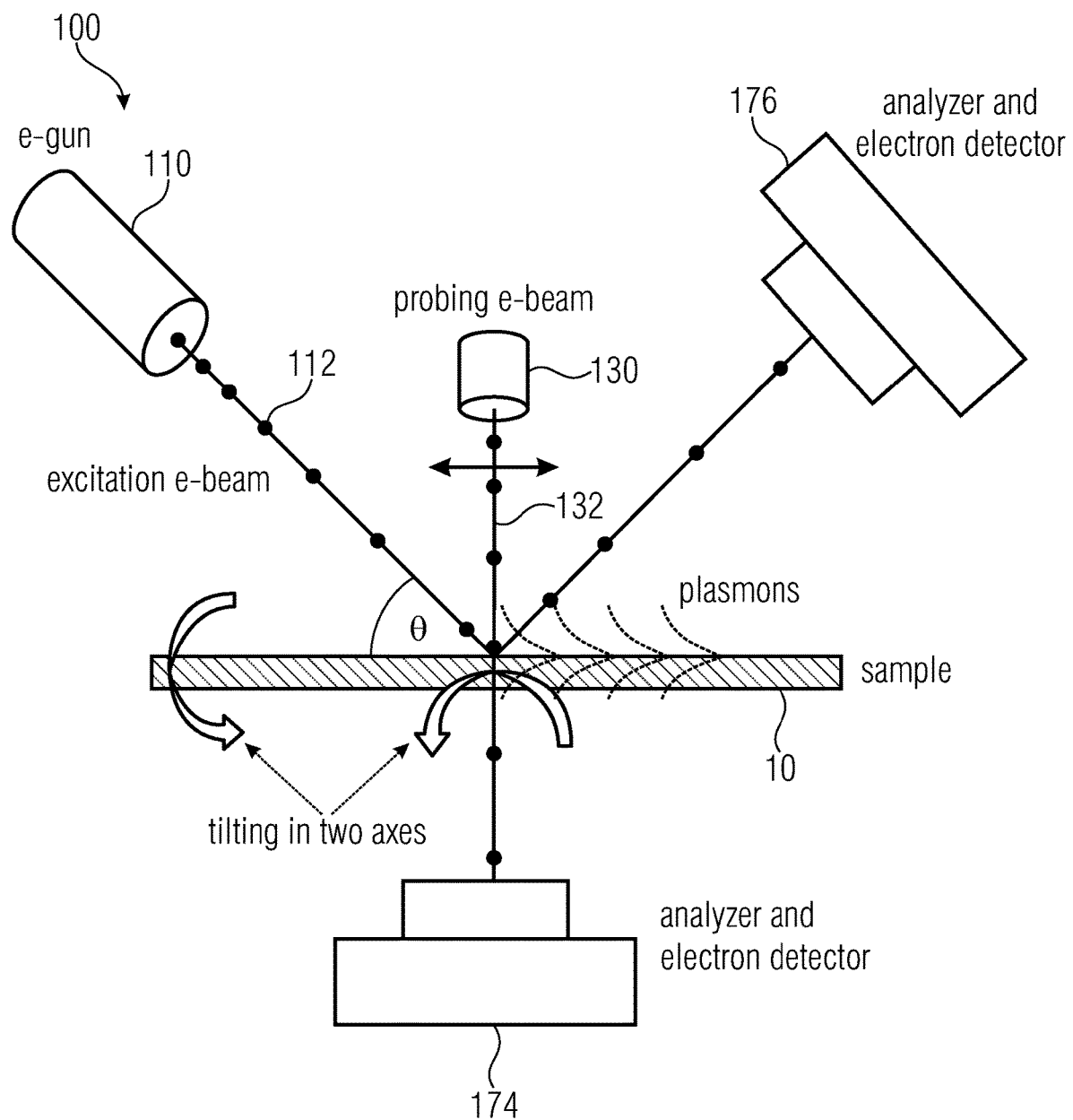
FIG. 12 illustrates another example of the measurement system.

FIG. 12 illustrates another example of the measurement system 100. According to this example, the probing radiation 132 comprises an e-beam. For example, the e-beam 132 may be provided by an e-beam source which may be part of the probing unit 130. That is, a measurement system 100 may comprise a first e-beam source as the excitation-beam source 110 for providing the excitation-beam 112 and may further comprise a second e-beam source as the probing unit 130, which may provide the probing radiation 132.

According to an embodiment, the measurement system 100 comprises an electron detection unit 174,176 which is configured for detecting electrons scattered and/or emitted by the sample 10.

For example, the electron detection unit 174 may serve as the detection unit 170, or the electron detection unit 174 may be additional to the detection unit 170. For example, the detection unit 170 may comprise a first electron detection unit 174, and the measurement system 100 may comprise one or more further electron detection units 176.

For example, the detection unit 170 may be configured for detecting electrons of the probing e-beam 132 which may have been scattered, elastically or inelastically, or transmitted by the sample 10.

For example, an additional electron detection unit 176 may be configured for detecting electrons of the excitation e-beam 112 scattered elastically or inelastically by the sample 10.

The detection unit 174, 176 may be configured for detecting electrons emitted from the sample. For example, the sample 10 may emit electrons due to Auger-processes which may occur due to an interaction of the sample 10 with an e-beam or with electromagnetic radiation.

According to an embodiment, the measurement system 100 comprises a first e-beam source as the excitation-beam source 110, a second e-beam source as the probing unit 130, the electron detection unit 174 as the detection unit 170 and further comprises a photodetector, for example the photodetector 172 as described with respect to FIG. 11. Optionally, the measurement system 100 further comprises the additional electron detection unit 176.

Figure 28:
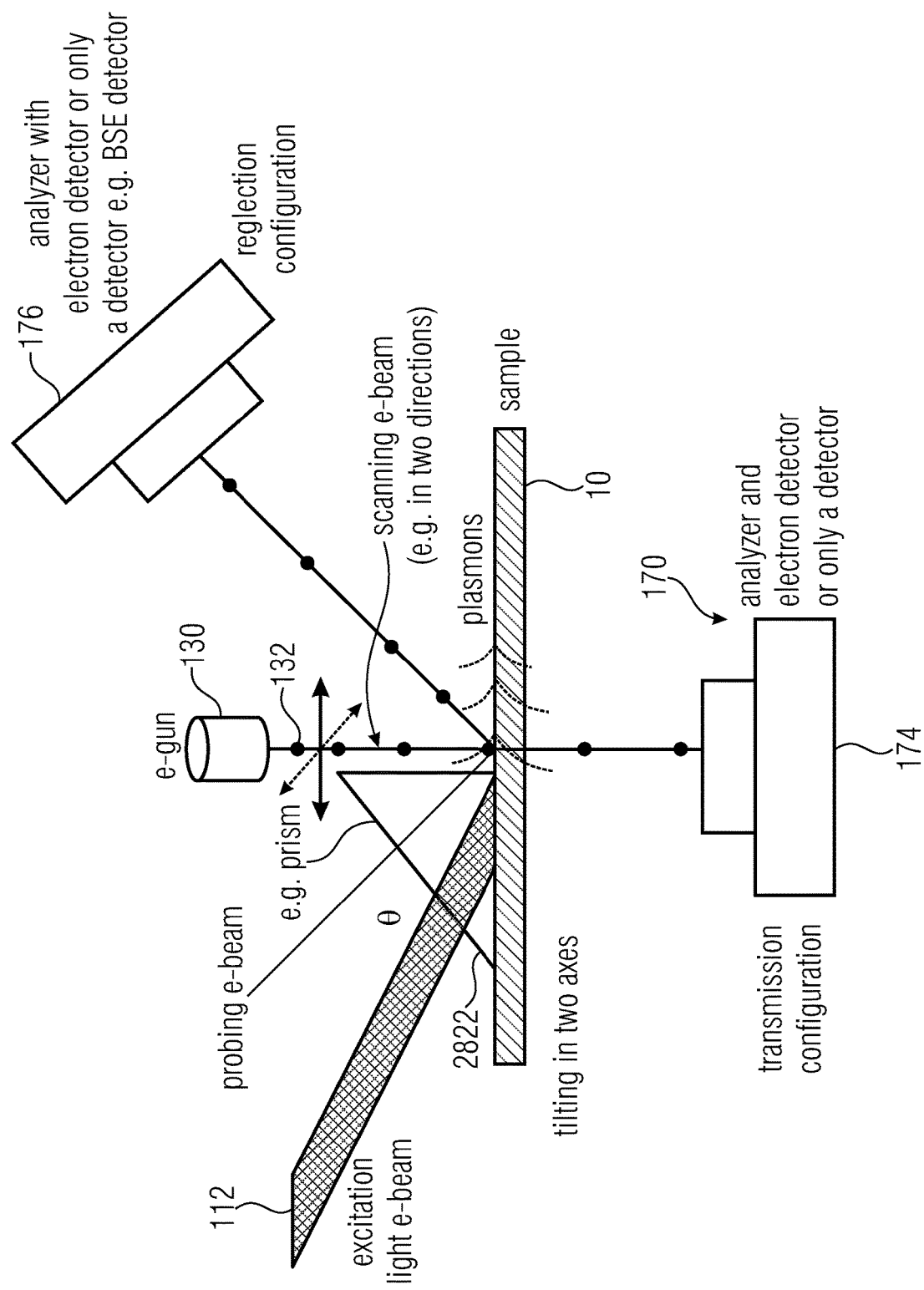
FIG. 28 illustrates another example of the measurement system.

FIG. 28 illustrates another example of the measurement system 100, which is similar to the example illustrated in FIG. 12. In contrast to the example of FIG. 12, in the example of FIG. 28 electromagnetic radiation serves as the excitation beam 112. The electromagnetic radiation 112 is configured to irradiate the sample 10 through a coupling element 2822 which is arranged adjacent to the sample 10. For example, the coupling element 2822 may correspond to the prism 422, the grating 622 or the coupling element 722, 822. An e-beam source 130 may provide the probing radiation 132, which may be detected by the electron detectors 174, 176. The electron detector 174, 176 may optionally comprise an electron analyzer. Further details are described with respect to FIG. 12.

Figure 13:
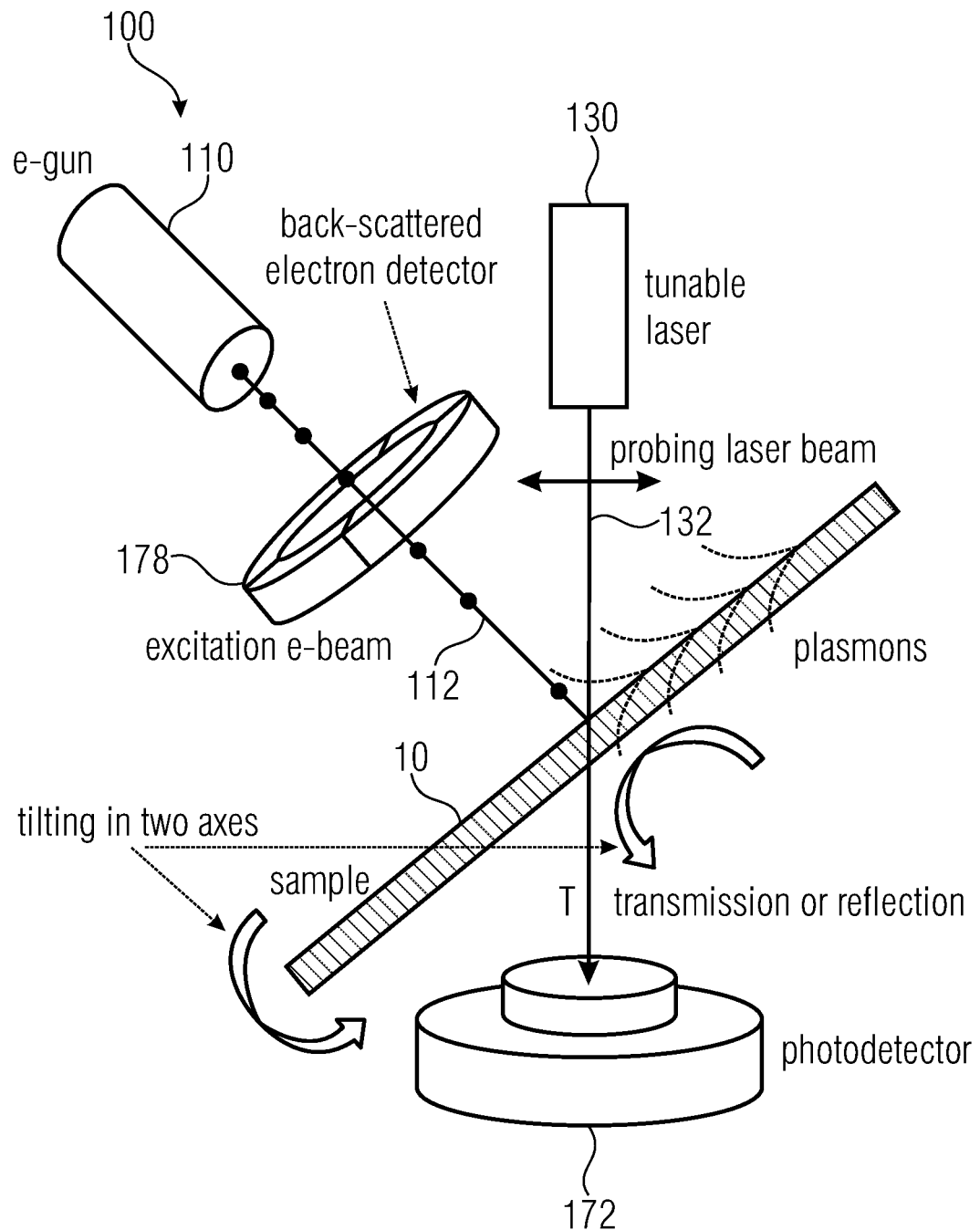
FIG. 13 illustrates another example of the measurement system.

FIG. 13 illustrates another example of the measurement system 100, according to which the measurement system 100 comprises an e-beam source as excitation-beam source 110 for providing the excitation-beam 112, and further comprises an electromagnetic radiation source, for example a tunable laser, as the probing unit 130 for providing the probing radiation 132. Further, the measurement system 100 may comprise a photo-detector for obtaining the information about the interaction of the probing radiation 132 with the sample 10. Further, the measurement system 100 according to this example comprises an electron detection unit 178 which is configured for detecting electrons of the excitation-beam 112 which are backscattered by the example 10, for example into a direction from which the excitation-beam 112 irradiates the sample 10, for example within an angular deviation of ±40°. The electron detection unit 178 may be an example of, or may correspond to, the electron detection unit 174, 176. For a description of the electromagnetic radiation 130, the probing electromagnetic radiation 132 and the photodetector 172 as well as the interaction of the electromagnetic radiation 132 with the sample 10, reference is made to the description of FIGS. 12 and 13.

Figure 14:
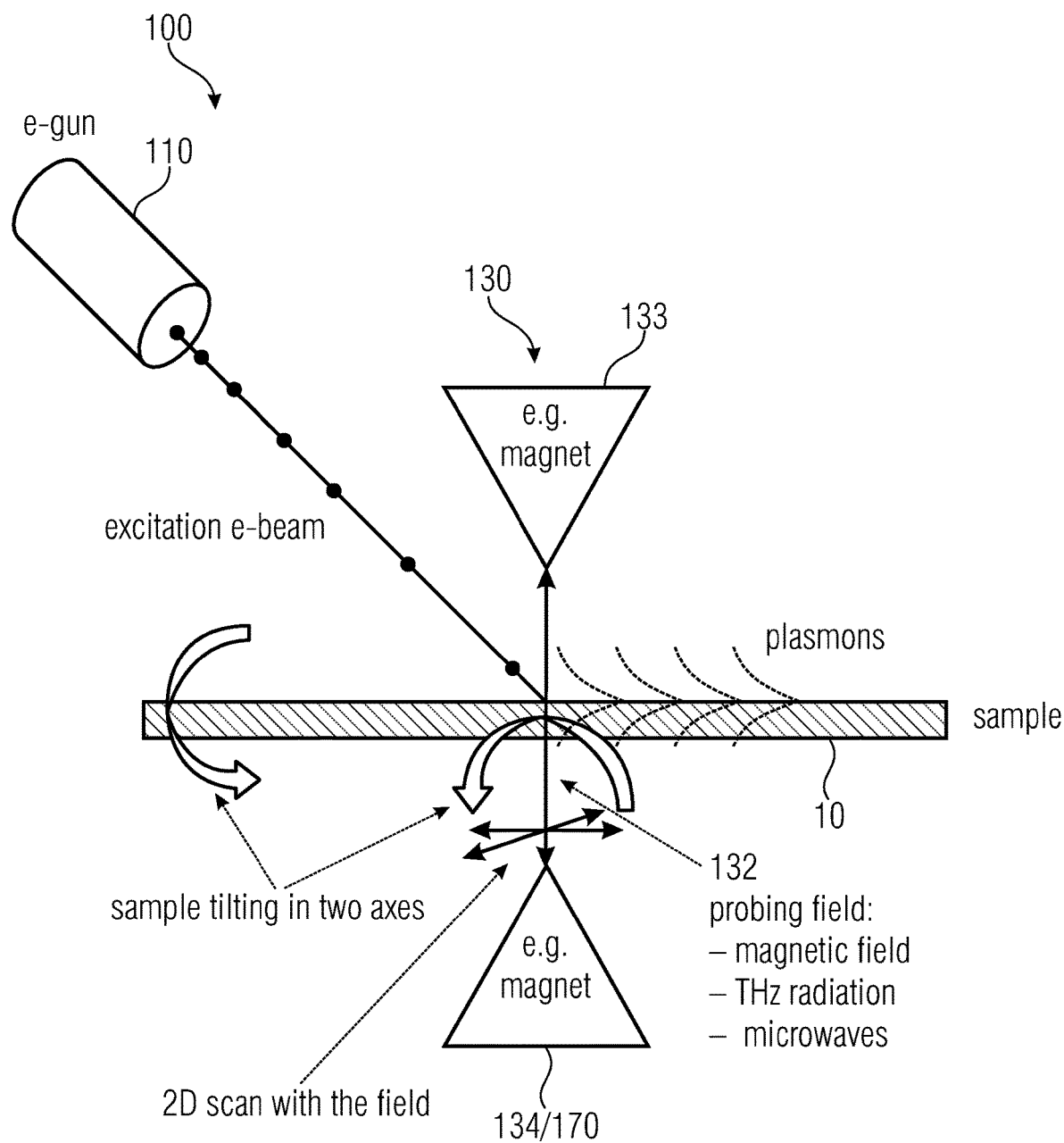
FIG. 14 illustrates another example of the measurement system.

FIG. 14 illustrates another example of the measurement system 100, according to which the probe unit 130 is configured for exposing the sample 10 to a probing field 132, and wherein the probing field 132 comprises an electromagnetic field, for example a magnetic field.

For example, the probe unit 130 may comprise a magnet for providing the electromagnetic field 132. For example, the magnet may comprise a pair of coils 133, 134 or poles of two permanent magnets 133, 134, between which the sample 10 is arranged, and which provide the electromagnetic field 132. In this case, the detection unit may be configured for detecting a modification of the electromagnetic field 132.

For example, the detection unit 170 is configured for detecting a modification of a magnetic field by the sample 10.

According to another example, which is also described with respect to FIG. 14, the probe unit 130 comprises a transceiver 133, for example a coil, or a permanent magnet 133 for generating the electromagnetic field 132. The detection unit 170 may comprise a sensor, for example, a sensor for a magnetic field, such as a magnetometer, or may comprise a receiver, such as a coil, for receiving the electromagnetic field so as to obtain the information about the interaction of the electromagnetic field 132 with the sample 10.

For example, the detection unit 170 may detect an intensity, a homogeneity, a direction, a gradient or field lines of a magnetic field.

Thus, the measurement system 100 may enable an investigation of magnetic plasmon resonance phenomena.

Accordingly, the detection unit 170 may comprise a receiver unit configured for receiving an electromagnetic radiation or an electromagnetic field, wherein the electromagnetic radiation or the electromagnetic field are based on the electromagnetic radiation 132 or the electromagnetic field 132 emitted by the probe unit 130.

According to an embodiment, the measurement system 100 comprises a manipulation field source 190 configured for exposing the sample 10 to an electromagnetic manipulation field, and the detection unit 170 is configured for obtaining an information about an interaction of the probing radiation 132 or the probing field 132 with the sample 10 independent on the manipulation field 192.

For example, the manipulation field source may be implemented by a magnet, for example by a pair of coils 133, 134 or poles of two permanent magnets 133, 134 between which the sample 10 is arranged, as described with respect to an implementation of the probe unit 130 with respect to FIG. 14. Thus, the manipulation field source may provide a magnetic field which may interact with the sample 10.

For example, the manipulation field source may be combined with the probe unit 130 comprising an e-beam source or an electromagnetic radiation source, such as a laser, and the detection unit 170 comprising a photodetector 172 or an electron detection unit 174, 176, 178.

In other words, the measurement system 100 according to FIG. 12 may be applied in a probing mode, in which an e-beam is used to excite bulk and surface plasmons in the material or structure. Then a magnetic or an electromagnetic field is used to scan the material/structure in the excited state i.e. in the presence of the generated plasmon. The technique may investigate the interaction of the magnetic field with the plasmon. This interaction may occur as an interaction of the external magnetic field (the probe) with the local field of the plasmon or with the plasmon itself as a composition of charged particles or dipoles. Different effects may occur depending on the orientation and the strength of the magnetic field vector $\overline{H}$. A magnetic field vector $\overline{H}$ parallel to the surface of the sample may accelerate or decelerate the plasmon propagation thus causing a synchrotron effect i.e. emission of radiation, whose frequency is dependent on the strength of the magnetic field, on the radius of curvature of electrons movement and other local parameters. This effect may lead to dissipation of the plasmon and the output signal is emission of radiation. The characteristics of the emitted radiation may be uniquely related to the plasmon, to the structures and the materials in which the plasmon develop and to the external magnetic field. A magnetic field vector $\overline{H}$ perpendicular to the surface of the sample—in case of strong magnetic field—may twist the electrons in direction from the surface and will most probably damp the plasmon stimulating its dissipation and degradation. How strong the magnetic field hast to be in order for this effect to take place may depend on various factors such as the material, in which the plasmons develop, the plasmon energy, the skin depth etc. For some materials, it may be >1 T (Tesla), for other it may be <1 T. A magnetic field vector $\overline{H}$ perpendicular to the surface of the sample—in case of weak magnetic field—if it is weak enough, may not twist the electrons (composing the plasmon), but the interaction between the magnetic field and the plasmon may still occur. This interaction may cause disturbance of the magnetic field leading to slight modification of the parameters of the magnetic field. The change of the parameters may be analyzed and used to extract information about the presence of a plasmon, about the lateral and longitudinal extension of the plasmon and the plasmon field, respectively about the propagation length of the plasmon, about the materials and the structure themselves, in which the plasmon develops, the localization of the plasmon etc. A second measurement may be performed with the e-beam source switched off, thus in the absence of an excited plasmon. This may be the ground state of the material for the method. Then, the method may compare the signals in the presence and in the absence of a plasmon. For more comprehensive analysis, the technique may be applied also in a raster mode.

According to an embodiment, the probing radiation 132 comprises a microwave radiation or a terahertz radiation. Probing of plasmon/-polaritons by THz radiation is attractive from the point of view of the time scale of the process: the typical lifetime of surface plasmon/-polaritons is $\tau=10^{-13}-10^{-15}$ sec. On the other hand, the relaxation time of the free electron gas in metals is on the order of $10^{-14}$ sec corresponding to a frequency of 100 THz. Thus, THz radiation may be able either to modulate or to scan the plasmon/-polaritons, depending on the parameters and conditions of the interaction process.

Figure 15:
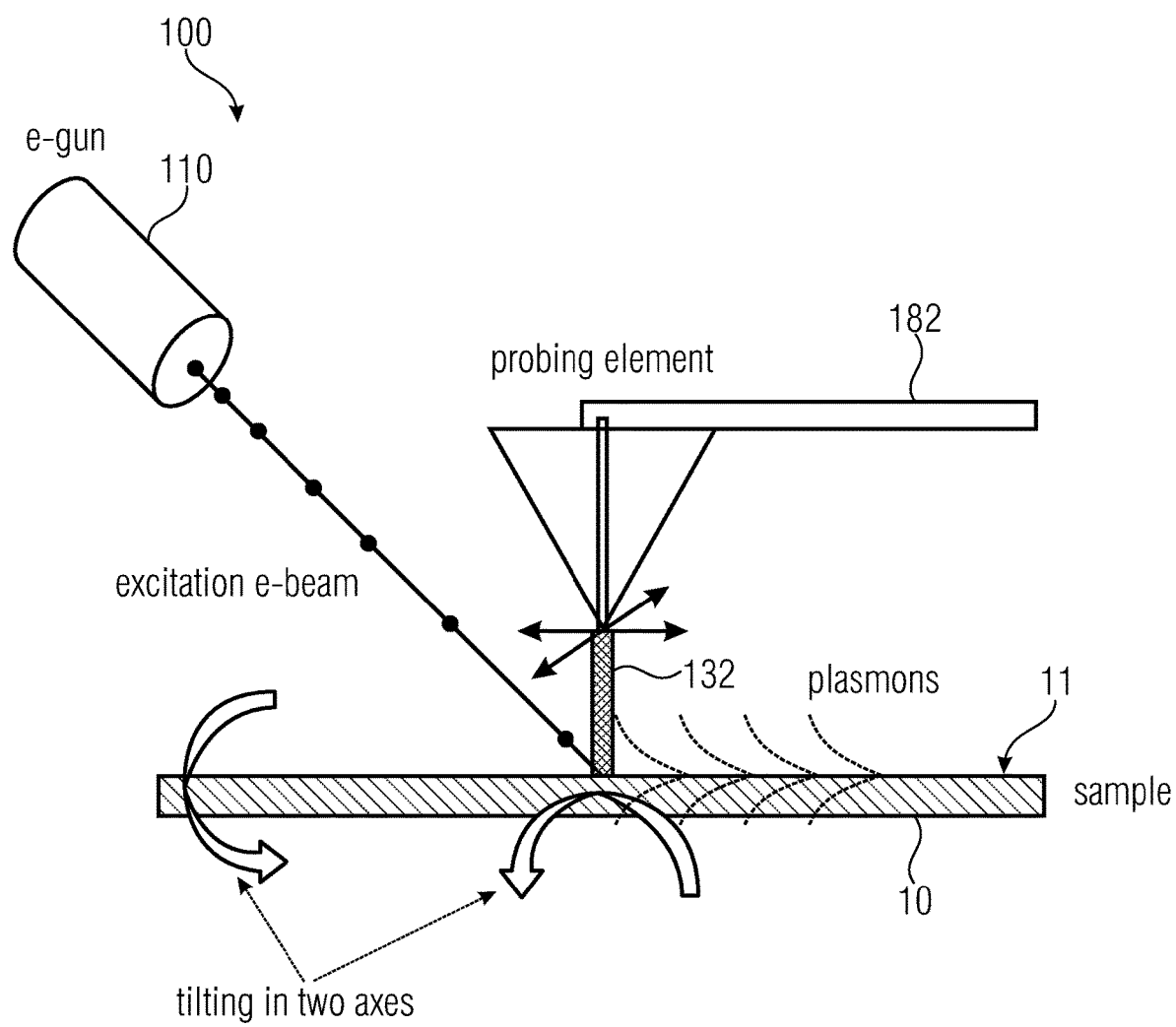
FIG. 15 illustrates another example of the measurement system.

FIG. 15 illustrates another example of the measurement system 100 according to which the excitation-beam source 110 comprises an e-beam source, and the probe unit 130 comprises a probing element 182. The probing element 182 may be arranged close to the main surface region 11 of the sample 10. The probing element 182 may be adapted for detecting an electromagnetic field, for example an electromagnetic field caused by a plasmon/-polariton at the main surface region 11 of the sample 10. The probing element 182 may also detect a potential or a density of states at the surface 11 of the sample 10.

Figure 16:
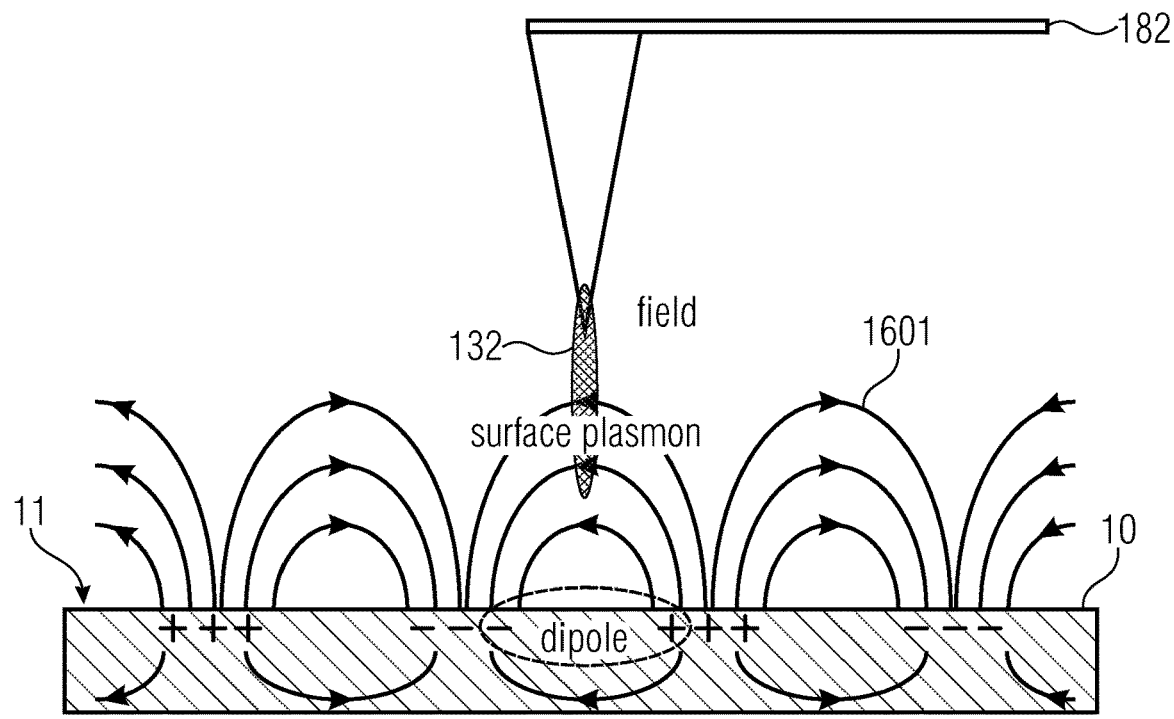
FIG. 16 illustrates an example of a probing element.

FIG. 16 illustrates an example of the probing element 182, according to which the probing element 182 is configured for detecting an electromagnetic field. For example, the probing element may 182 provide an electromagnetic field, e.g. generated by a current through a coil, which may interact with an electromagnetic field 1601 of a surface plasmon/-polariton at a main surface region 11 of the sample 10. For example, the detection unit 170 may be configured for obtaining the information about the interaction by measuring a force between the probing element 182 and the main surface region 11. For example, the probing element 182 comprises a coil or a magnet sensor.

According to an embodiment, the probing element 182 is adapted for guiding a magnetic field from a magnetic field source to a surface of the sample.

Alternatively, the probing element 182 may comprise a sensor for sensing the electromagnetic field 1601.

Figure 17:
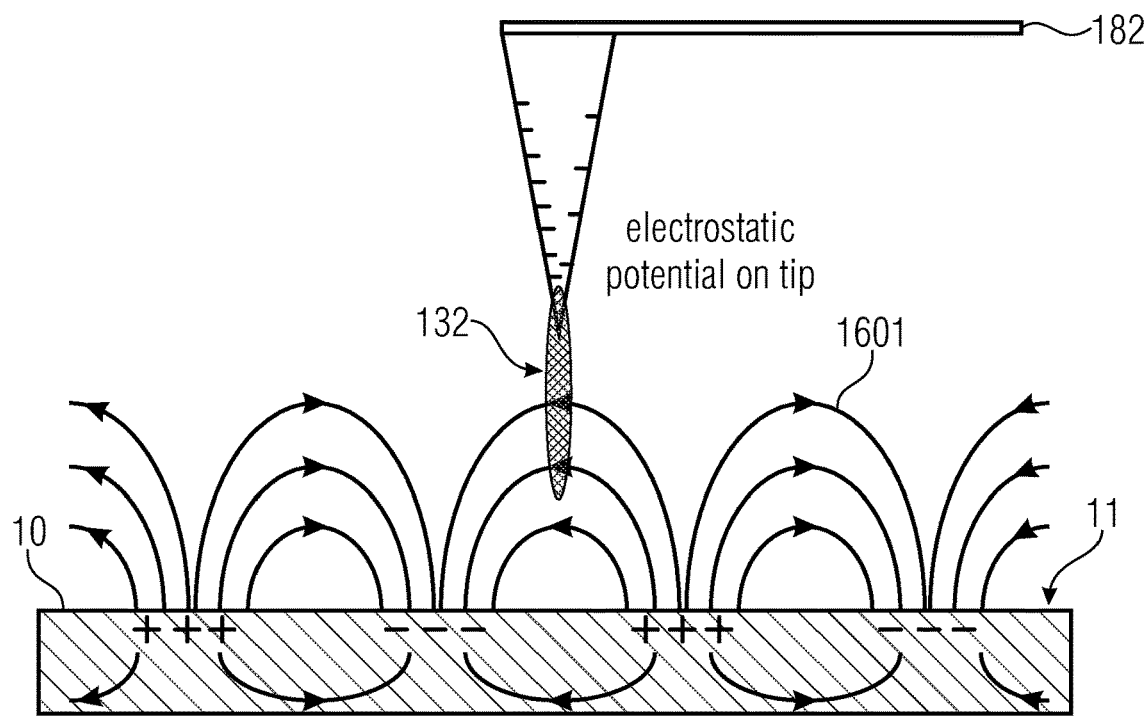
FIG. 17 illustrates an example of a conductive tip.

FIG. 17 illustrates another example of the probing element 182, according to which a potential is applied between the probing element 182 and the sample 10 or according to which the probing element comprises a charged tip, so as to provide for an electrostatic field 132 between the probing element 182 and the sample 10.

For example, the probe unit 130 is configured for applying an electrostatic potential between a conductive tip and the sample 10 for providing the probing field 132, wherein the detection unit is configured for detecting a current between the conductive tip and the sample 10.

For example, the detection unit 170 may be configured for obtaining the information about the interaction between the electrostatic field 132 and the sample 10 by determining a tunneling current or a repulsion between the probing element 182 and the sample 10.

For example, the probing element 182 comprises an oscillating cantilever, optionally comprising a conductive tip.

For example, the probing element 182 may comprise a piezo element and/or may be similar to a cantilever of an atomic force microscopy setup.

Accordingly, the probe unit 130 may be configured for exposing the sample 10 to the probing field 132, and the probing field 132 may comprise an electrostatic field.

According to an embodiment, the measurement system 100 further comprises an analyzer configured to obtain the information about the sample 10 based on an information about an interaction of the probing radiation 132 or the probing field 132 with the sample 10. For example, the analyzer may evaluate or compare information about the interaction or obtained for different parameters, so as to obtain information about the sample.

For example, the excitation-beam 112 is configured for exciting the sample 10 from a ground state to an excited state, and the detection unit is configured for obtaining the first information about an interaction of the probing radiation 132 or the probing field 132 or the sample 10, while the sample 10 is in the excited state. Further, the detection unit 170 may be configured for obtaining the second information about an interaction of the probing radiation 132 of the probing field 132 with the sample 10 while the sample 10 is in the ground state. Further, the analyzer is configured for comparing the first information to the second information to obtain the information about the sample 10.

According to another example, the measurement system 100 is configured for obtaining a plurality of measurement of an information about an interaction of the probing radiation 132 or the probing field 132 with the sample 10, wherein the plurality of measurements of the information about the interaction is obtained from a plurality of relative positions and/or relative angles of the excitation spot and the detection spot.

According to another example, the measurement system 100 is configured for adapting a position of an excitation spot and/or a detection spot relative to the sample 10. The excitation spot is a surface region of the sample 10, which is to be irradiated with the excitation-beam 112. The detection spot is a surface region of the sample, which is to be exposed to the probing radiation 132 or the probing field 132. For example, the detection unit is configured for obtaining the first and/or the second information about the interaction in dependence on the position of the excitation spot and/or the detection spot.

For example, the excitation spot is a region on the surface 11 of the sample 10, within which the excitation-beam 112 interacts with the sample 10. Accordingly, the detection spot may be a region on the surface 11 of the sample 10 within which the probing field 132 and/or the probing radiation 132 interact with the sample 10. For example, adapting the detection spot and/or the excitation spot may be implemented by moving the sample 10, or may be implemented by adapting the excitation-beam 112 and/or a position or a direction of the probing field 132 or the probing radiation 132.

For example, the analyzer is configured for obtaining a spatial image of an excited plasmon/-polariton based on a plurality of measurements of an information about an interaction of the probing radiation 132 or the probing field 132 with the sample 10, wherein the plurality of measurements of the information about the interaction is obtained from a plurality of relative positions of the excitation spot and the detection spot.

In other words, the technique may be applied in a raster mode, in which the light beam 132, e.g. according to the measurement system 100 shown in FIG. 11, may perform a line-by-line spatial scan on the surface 11 of the sample 10 around the plasmon/-polariton. This allows for probing both along the propagation length of the plasmon/-polariton and in a lateral direction to the direction of the plasmon/-polariton propagation.

The raster mode may be possible also by moving the sample in such a scanning mode (this may be allowed due to a xy degree of freedom of the sample holder, e.g. in a direction perpendicular to the probing beam 132).

Similarly, the measurement system 100 shown in FIG. 14 may be applied in the raster mode, in which the probing element 182 with a field performs a line-by-line spatial scan on the surface of the sample around the plasmon/-polariton. This may allow for probing both along the propagation length of the plasmon/-polariton and in a lateral direction to the direction of the plasmon/-polariton propagation.

Thus, in combination with using of an electromagnetic field as probing field 132, the raster mode may be used also for imaging of plasmon/-polaritons and the structures/materials in which the plasmon/-polaritons reside (i.e. both probing and imaging modes should be possible when applying field as a probe).

Further, the raster mode may be applied for an imaging mode, using a combination of an e-beam for excitation of plasmon/-polaritons and a probe 132 in order to create a physical image of the plasmon/-polariton or the plasmon/-polariton field. In particular, the measurement system 100 according to FIG. 15 may be operated in the imaging mode, for example in terms of a scanning field. The technique may apply a scanning element 182, e.g. which may be a source or a transmitter of a scanning field. In one example, the probing element 182 comprises a wire or a coil of a proper design and electric current flows through the wire/coil. The electromagnetic field, created via the current flow, may extend outside the wire/coil and may be used for scanning. In another example, an electrostatic potential is applied between the scanning element 182 and the sample 10. In still another example, the probing element 182 is a transmitter receiving the field from a source. In still another example, a magnetic field is used for scanning, e.g. as may be implemented by the measurement system according to FIG. 14. For the scanning purpose, the probing element 182 may be brought very near to the sample's surface, in which the plasmon/-polariton resides. The interaction of the field from the tip with the plasmon/-polariton may occur as electrostatic interaction or as interaction of the field with the dipoles of the plasmon/matrix complexes. The characteristics of the probing field may be analyzed after the interaction with the plasmons/-polaritons. These characteristics will be used to visualize the plasmon/-polaritons. A second measurement may be performed with the e-beam source switched off, thus in the absence of an excited plasmon/-polariton. This may be the ground state of the material for the method. Then, the method may compare the signals in the presence and in the absence of a plasmon/-polariton. The technique may be applied in the raster mode.

For example, the measurement system 100 may be configured for tilting the sample 10 with respect to the excitation-beam 112 and/or the probing field 132 and/or the probing radiation 132, for example in one, two or more axes. Thus, the information about the interaction may be obtained in dependence on an angle between the sample 10 and the excitation-beam 112 and/or the probing field 132 and/or the probing radiation 13. Further, the measurement system 100 may be capable of rotating the sample 10.

For example, the measurement system 100 may comprise an e-beam for excitation of the plasmon/-polariton, a light beam for probing of the plasmon/-polariton and magnetic field for modulation of the plasmon/-polaritons, all the three simultaneously.

According to a further example, the measurement system 100 according to FIG. 12 may be operated in the imaging mode, for example in terms of angular-dependent e-beam scanning, using an e-beam for excitation of plasmons and for scanning the plasmons. In one example, the excitation e-beam 112 for excitation of the plasmons may have a low energy and a probing e-beam 132 may be applied for scanning the plasmons or the sample, the probing e-beam 112 having a higher energy. The low energy electrons may excite plasmons with much higher probability due to the fact that the energy of the plasmon may be proportional to a cross section of the inelastic scattering $\sigma_{inel}$ inversely in approx. 3-5 fold. This means that, if the maximum of the cross section of inelastic scattering is at 25 eV, then the energy of the plasmon may be roughly $E_{plas}$=5 eV. Thus, the higher energy electrons may be exploited for probing the plasmon. The physical process behind the probing may be scattering of the higher energy electrons on the plasmon. Both the elastically and the inelastically scattered electrons may be analyzed and used for creating a physical image of the plasmon. The energies of the scattered electrons, their angle of scattering, the wave vector of the output electrons (after scattering), etc. may be the parameters used for creation of the image. For example, these parameters may be contributions to the information about the interaction. An electron analyzer and electron detectors may be used after the sample similar to the ones used in EELS. Analytical methods may be applied, for example by the analyzer, to convert the analysis of these parameters into an image. The analytical methods may be implemented also for sorting out undesired signals. For instance, the high energy electrons may be able to produce secondary electrons, for example by driving out electrons from the atoms to escape the material. The secondary electrons may enter the analyzer and subsequently the detector with high probability, thus creating an undesired signal i.e. a noise signal. Such noise may be filtered out analytically.

In a similar manner, the measurement system 100 may perform an imaging by using a single e-beam both for excitation and for probing, but with more complex analytical methods. For example, such an imaging with one e-beam may be applied, if the measurement system 100 is implemented as having no second e-beam, for example in case the probing unit is implemented as electromagnetic/electrostatic radiation/field source.

The imaging mode thus may allow for obtaining dynamical image of the plasmon/polariton in 3D. A 3D image of the plasmon/plasmon-polariton will enable obtaining information simultaneously about: the special distribution of the electromagnetic field of the plasmon/plasmon-polariton; the topography of the structure, in which the plasmon/plasmon-polariton is excited; the defects in the structure; the absorption centers within the structure such as imperfections, impurities, dopants and about scattering centers and absorption centers. In case of propagating surface plasmons, this method may provide dynamical information about the 3D frame, in which the plasmon propagates.

Figure 18:
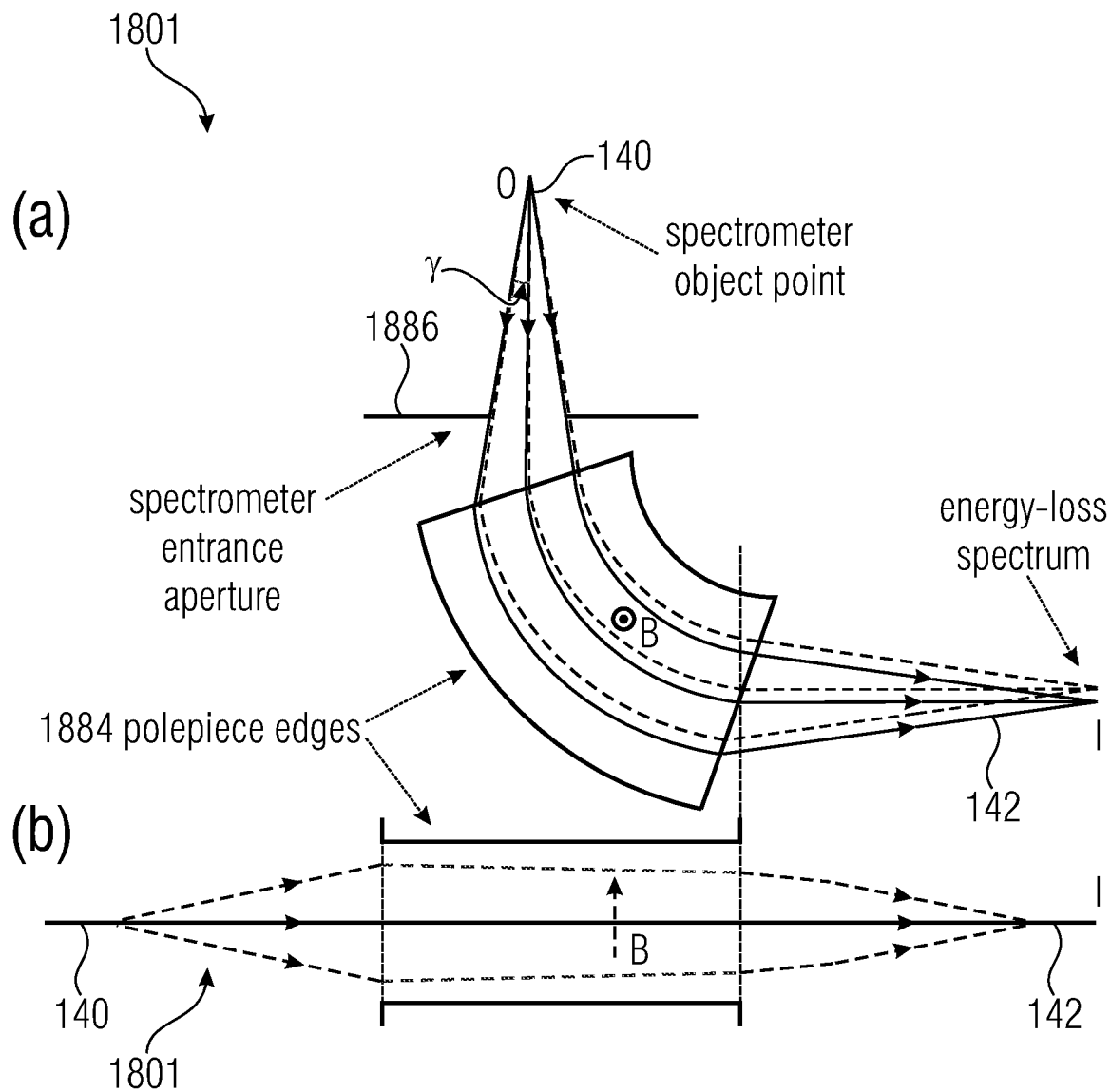
FIG. 18 illustrates an example of an electron analyzer.

For example, the electron detection unit 174, 176, 178 may comprise an electron analyzer and an electron detector. The electron analyzer may, for example, filter electrons of a specific kinetic energy or may separate electrons of different kinetic energies, for example spatially. FIG. 18 illustrates an example of an electron analyzer 1801. The upper and lower panels of FIG. 18 illustrate views of the analyzer 1801 along different directions perpendicular to an incident e-beam 140, respectively. The electron analyzer 1801 may comprise an entrance aperture 1886. Further, the electron analyzer comprises pole pieces 1884 which provide a magnetic field perpendicular to a direction of the incident e-beam 140. Depending on the kinetic energy, electrons of incident e-beam 140 may be deflected differently so that electrons of a different kinetic energy of an output e-beam 142 of the electron analyzer may pass through different positions in space.

Figure 19:
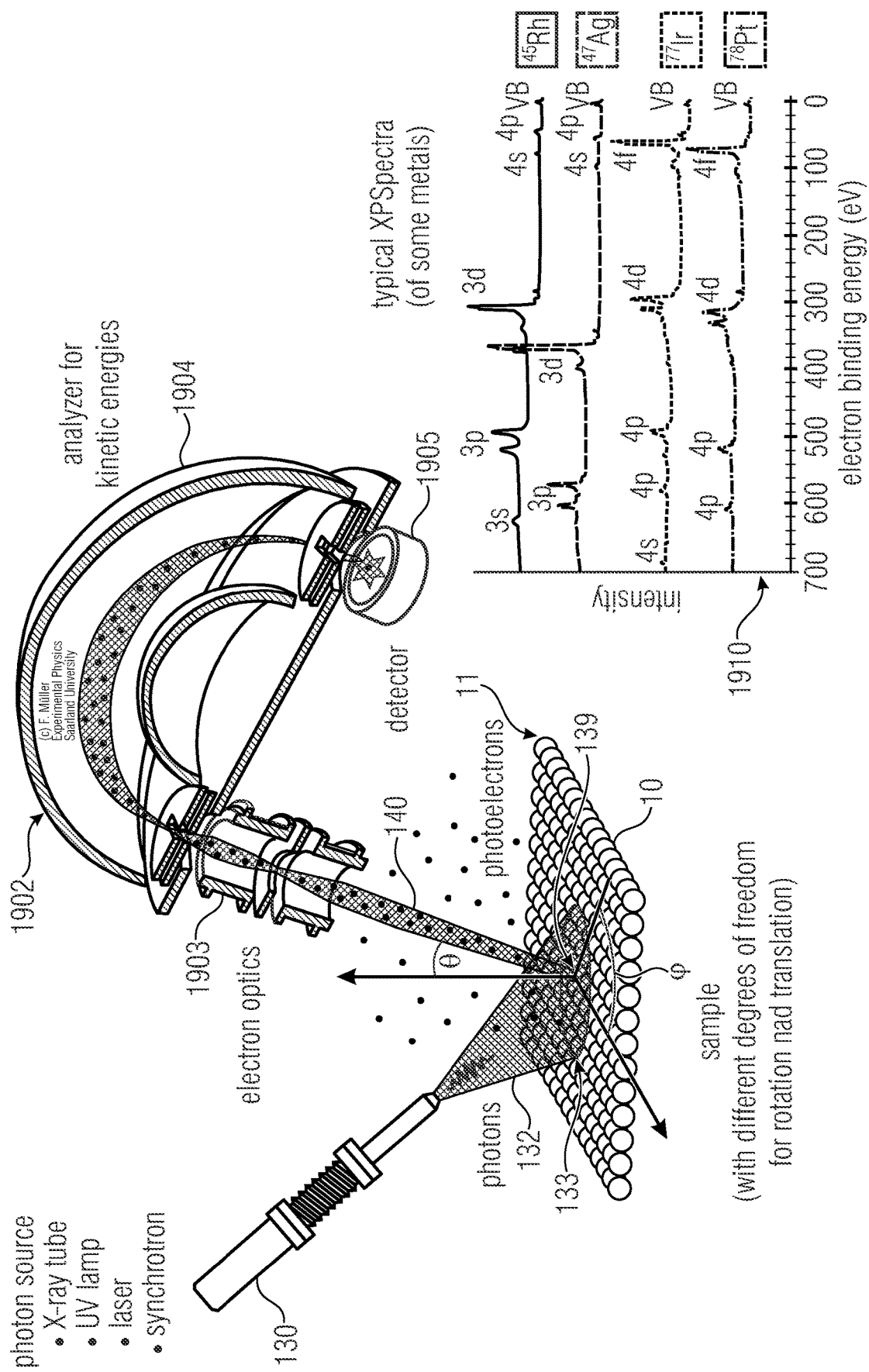
FIG. 19 illustrates an example of an electron detection unit.

FIG. 19 illustrates an example of an electron detection unit 1902 in the context of detecting photoelectrons, which may also be adjusted to measure the scattered electrons of the excitation beam 112 or the probing beam 132. The electron detection unit 1902 may correspond to the electron detection unit 172, 174, 176. For example, such a detection of photoelectrons may be implemented by the measurement system 100. For example, the probe unit 130 may comprise a photon source such as an X-ray tube, a UV lamp, a laser or a synchrotron source. The electromagnetic radiation 132, for example photons emitted by the probe unit 130, may interact with the sample 10 within the excitation spot 133. The electron detection unit 1902 may comprise electron optics 1903 adapted for collecting electrons scattered or emitted from a detection spot 139 of the sample 10 at an angle θ with respect to a direction perpendicular (normal) to a main surface region 11 of the sample 10. The electron optics 1903 may be adapted for guiding the collected electrons to an electron analyzer 1904, for example the electron analyzer 1801. An output e-beam of the electron analyzer 1904 may be detected by an electron detector 1905. FIG. 19 further shows an exemplary diagram 1910 comprising typical X-ray photo spectroscopy spectra of some metals.

Figure 20:
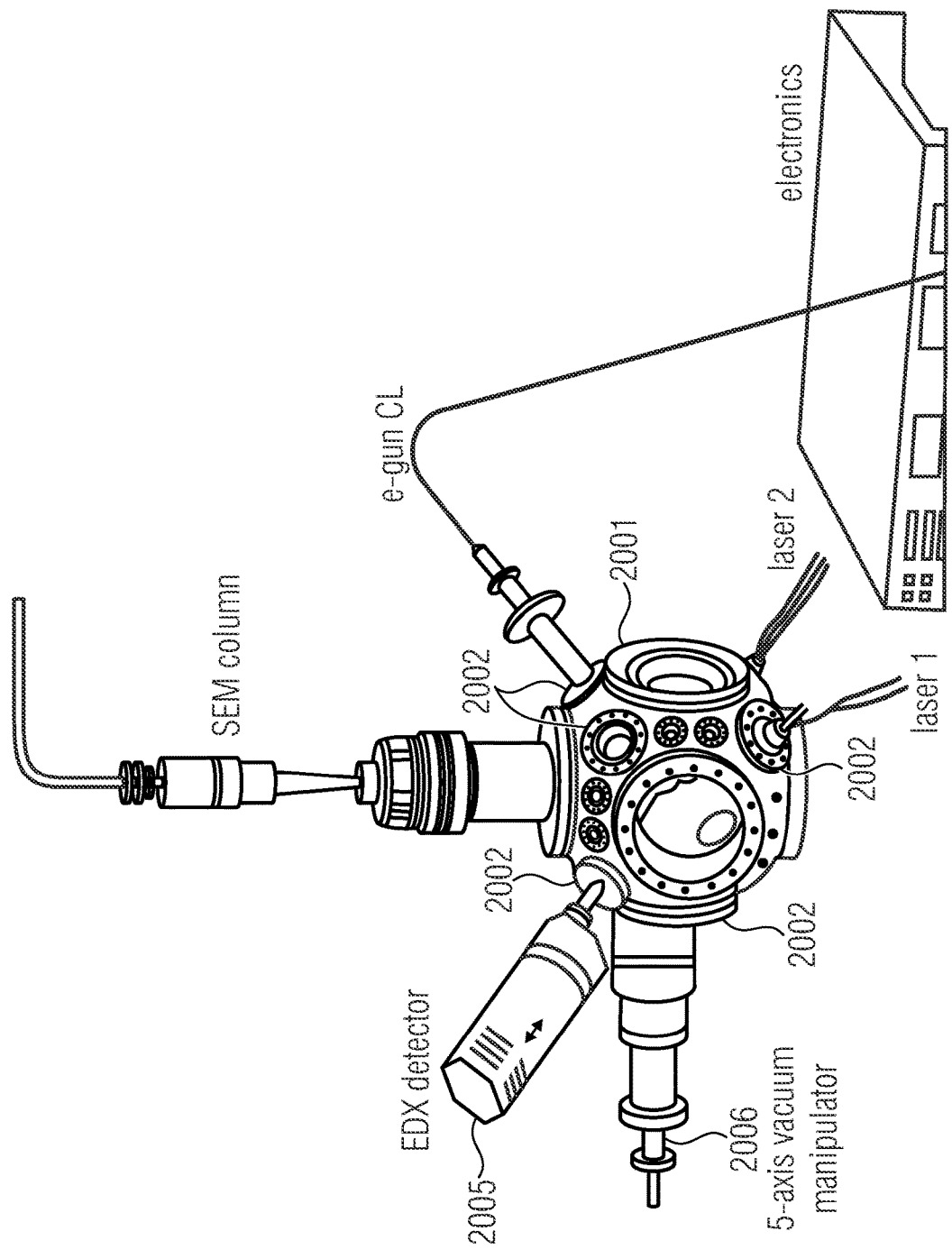
FIG. 20 illustrates an example of a vacuum chamber with excitation and detection units.
Figure 21:
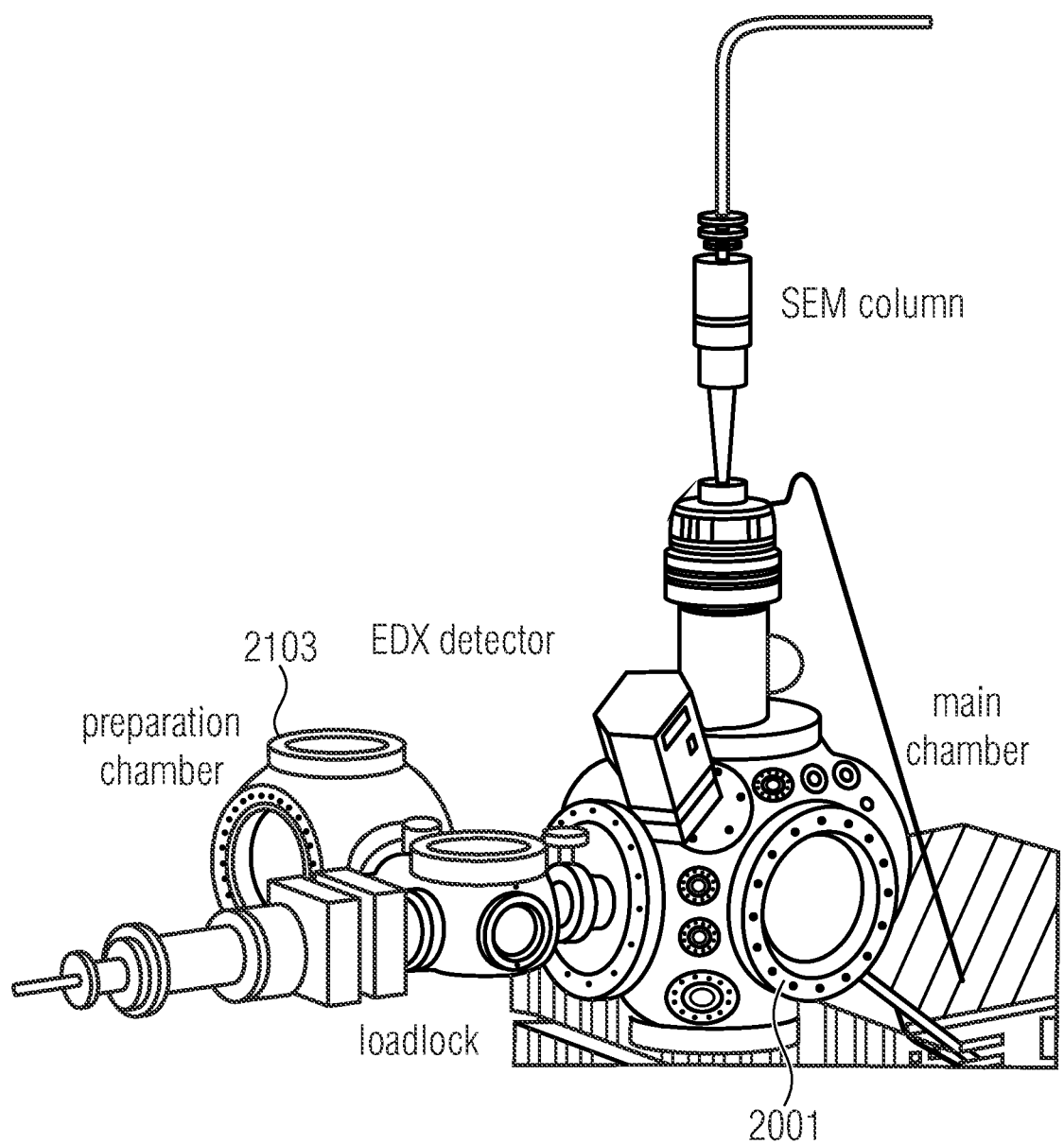
FIG. 21 illustrates another example of a vacuum chamber with excitation and detection units.

According to an embodiment, the measurement system 100 comprises a vacuum chamber 2001 as illustrated in FIG. 20. The vacuum chamber may house a volume with a pressure below ambient pressure, e.g. an ultra-high vacuum, which may allow for an efficient propagation of an e-beam. For example, the vacuum chamber 2001 may comprise a mean for holding the sample 10 within the volume. The excitation-beam source 110, the probe unit 130, the detection unit 170, the manipulation field source, and additional detection units, such as an additional photodetector or an additional electron detection unit, may be arranged within the vacuum chamber 2001 or may be arranged outside of the vacuum chamber 2001 but may be connected to a port 2002 of the vacuum chamber 2001. The vacuum chamber 2001 may have one or more ports 2002, which may provide access to the vacuum chamber 2001, or which provide a means for mounting a device at the port so as to provide the device with access to the vacuum chamber 2001. For example, a vacuum manipulator 2006 may be connected to a port 2002. The vacuum manipulator may enable to move the sample 10, for example to rotate the sample 10 around one or more axes, for example five axes, or to translate the sample 10. For example, an energy dispersive X-ray detector, a scanning electron microscopy column, one or more lasers, and/or one or more optical fibers, for example for collecting electromagnetic radiation, such as cathodoluminescence, for example initiated by an electron gun, may be connected to the one or more ports 2002. FIG. 21 illustrates another example of a vacuum chamber 2001, to which a preparation chamber 2103 and a load lock 2104 are connected. The preparation chamber 2103 and the load lock 2104 may provide a means for preparing a sample 10 without the main vacuum chamber 2001 and to transfer the sample 10 from the preparation chamber 2103 into the main vacuum chamber 2001 without venting the main vacuum chamber 2001. The vacuum chamber 2001 may comprise windows for facilitating a convenient handling, and which may allow for adding additional measurement setups by replacing them so as to connect the additional setup instead.

For example, the measurement system 100 may be configured for exposing the sample 10 to a temperature in a range between 10 K and 900 K, and for obtaining the information about the sample 10 in dependence on the temperature.

For example, the measurement system 100 may enable an investigation of magneto-plasmonic effects, spin-plasmon-interaction, and may enable an observation of surface plasmon/-polaritons at various interfaces within one material, an excitation and characterization of bulk plasmon/-polaritons, an investigation of non-linear effects in the interaction of light and plasmon/-polaritons, and an identification of surface plasmon-polaritons.

The measurement system 100 may comprise or implement or may be expanded by further analysis techniques so as to contribute to ELSOM, which may provide for a convenient application of various spectroscopic and microscopic methods for investigating plasmon/-polaritons, but also some unique approaches for investigating the properties of these quasi-particles. For example, ELSOM may comprise or be capable of measuring: cathodo- (CL), electro- (EL), and photo-luminescence (PL), angle-resolved PL/CL/EL spectroscopy, electron laser spectroscopy, scanning transmission electron microscopy, assisted electron spin resonance spectroscopy, scanning electron microscopy, elemental analysis by X-ray spectroscopy, M-line spectroscopy, scanning near field optical microscopy (SNOM).

The measurement system 100 may be used for implementing the above methods or further methods such as back scattered electron spectroscopy, or may be applied as a regular tool for optical and electronic spectroscopy.

The measurement system 100 may be flexibly adapted to requirements of a specific experiment. For example, the measurement system 100 may be adapted, so that components and modules may be easily added, removed or moved, and functionality may be easily added by adding and removing software modules.

An automated version of the measurement system 100 may comprise an additional preparation chamber. For example, the automated version may be applied for an in-situ characterization, for example for the manufacturing of semiconductor materials, solar technology, semiconductor components and may be adapted for an integration in a manufacturing line.

Figure 22:
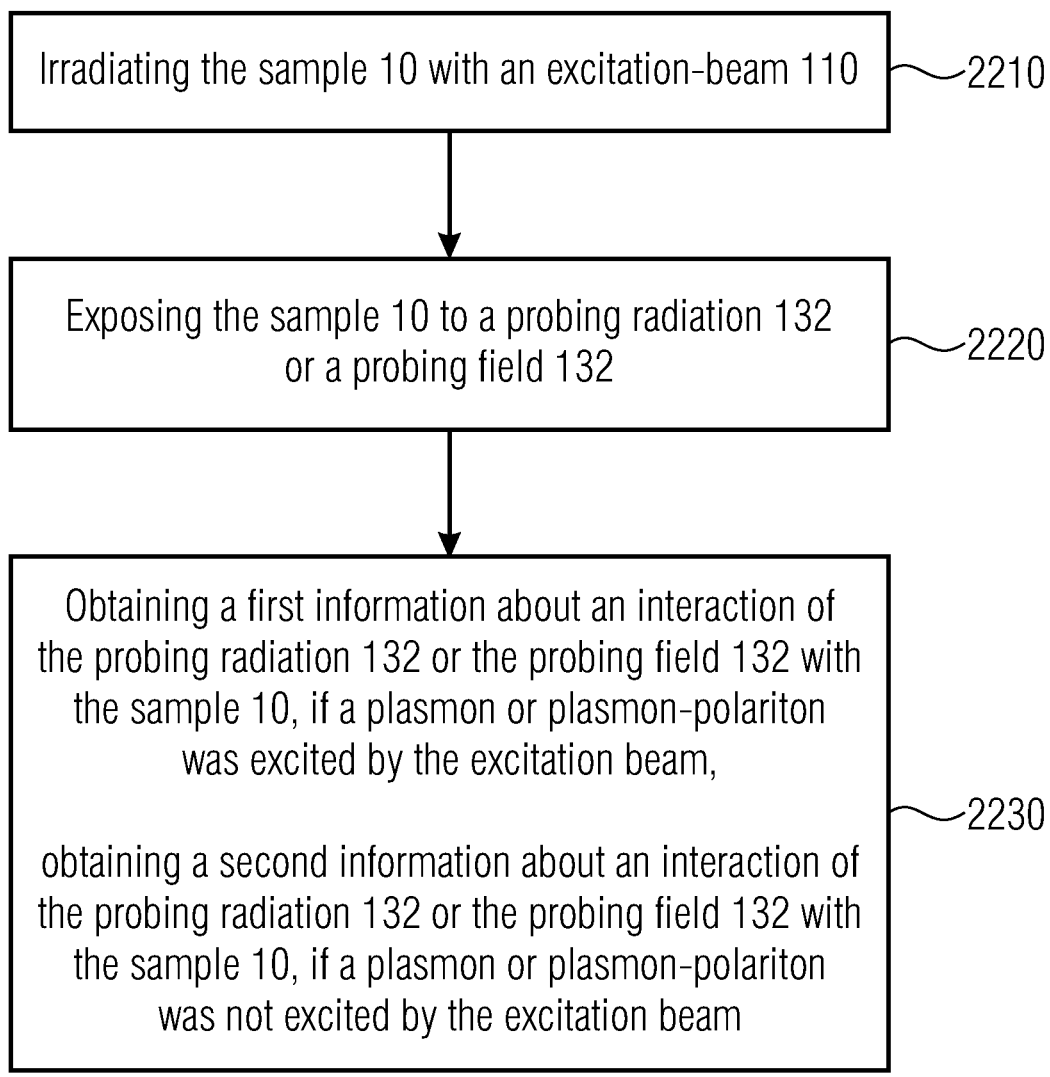
FIG. 22 shows a flowchart of a method for obtaining an information about a sample according to an embodiment.

FIG. 22 shows a flowchart of a method 2200 for obtaining an information about a sample 10 according to an embodiment. The method 2200 comprises a step 2210 of irradiating the sample 10 with an excitation-beam 112. A step 2220 comprises exposing the sample 10 to a probing radiation 132 or a probing field 132. Step 2210 and step 2220 may take place simultaneously. Alternatively, from the point of view of time, step 2210 may happen before step 2220 and step 2220 may happen during the lifetime of the plasmon/-polariton. Further, the method 2200 comprises a step 2230 of obtaining a first information about an interaction of the probing radiation 132 or the probing field 132 with the sample 10, if a plasmon/-polariton was excited by the excitation-beam. The step 2230 further comprises obtaining a second information about an interaction of the probing radiation 132 or the probing field 132 with the sample 10, if a plasmon/-polariton was not excited by the excitation-beam.

The method 2200, which may correspond to CELS, may implement both a light source and an e-beam source for the analysis of the sample. The light and/or the e-beam impinging on the sample may trigger various physical processes in addition to the desired plasmon/-polariton excitation and probing. Some of the processes may emerge simultaneously with the plasmons/-polaritons. The signals from the parallel processes may thus count as a noise background to the signals related to the plasmons/plasmon-polaritons. Hence, the method may be configured to sort out the undesired signals and the obtained final signal or image of the plasmon/plasmon-polariton has to be free from such parasitic effects.

Figure 26:
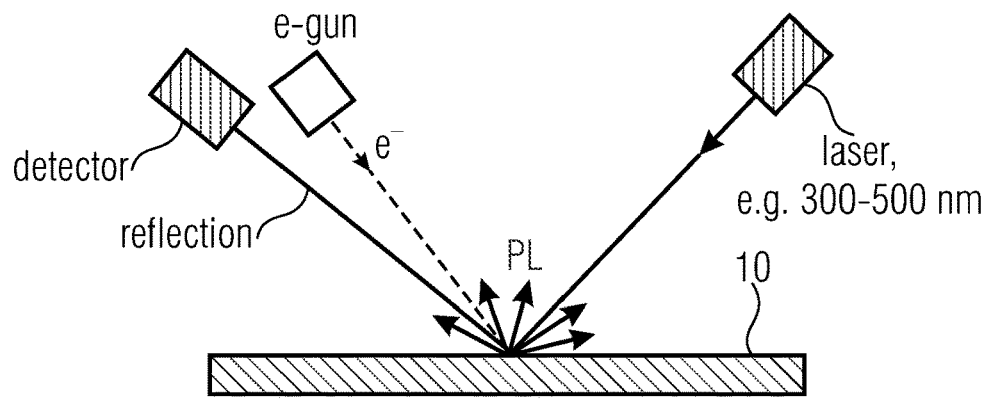
FIG. 26 illustrates examples of possible signals from a sample induced by electromagnetic radiation.
Figure 27:
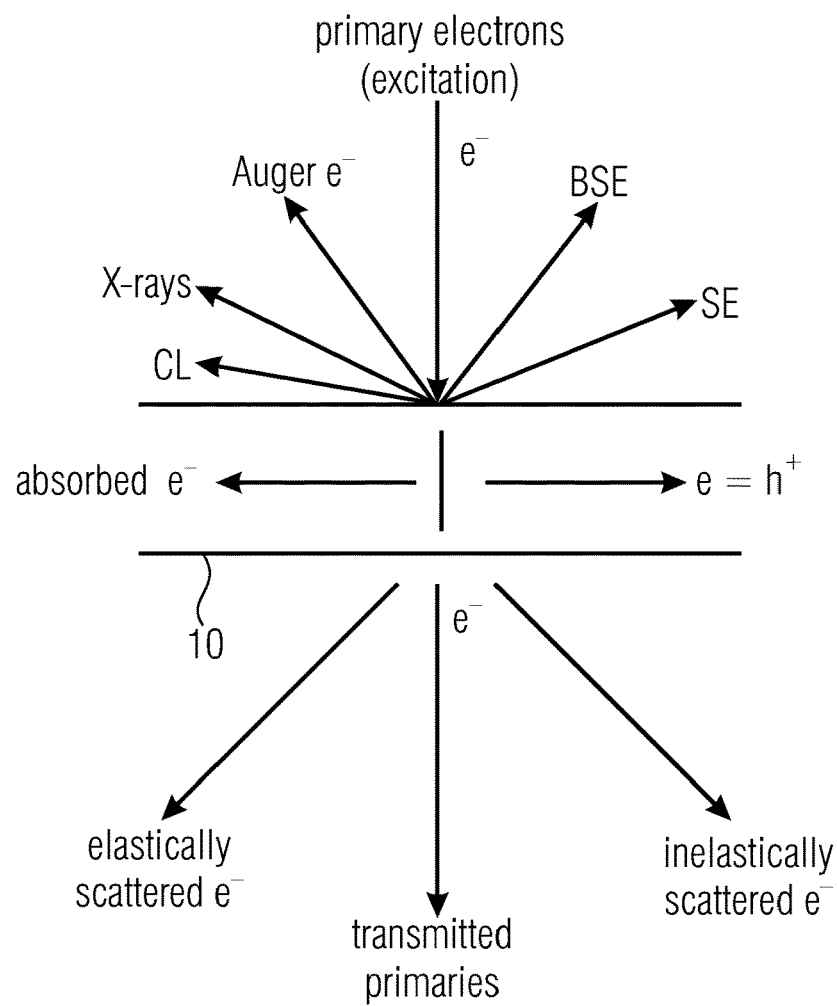
FIG. 27 illustrates examples of possible processes in a sample induced by an e-beam.

FIG. 26 shows a simplified drawing of signals which may be induced by a laser beam hitting a sample. A photodetector registers a reflection of the laser beam on the surface of the sample and photoluminescence (PL) from the sample. FIG. 27 demonstrates processes, which may be triggered by an e-beam impinging on a sample: SE—secondary electrons; BSE—back-scattered electrons from the primary e-beam; CL—cathodoluminescence; Auger e⁻—Auger electrons. For example, for BSE and SE signals, energy selection filters or spatial filters may be applied etc.

In the following, additional features and functionalities as well as physical background is explained, on which features and functionalities of examples of the disclosure may rely.

Some embodiments may comprise an e-beam source and an electron detection unit, which may allow for EELS of the sample. According to an example of EELS, an energy analyzer separates the electrons spatially based on their different velocity, and a spectrum is recorded via an array of photodiodes or a charge couple device. Each kind of interaction between the e-beam and the sample causes a characteristic modification of the energy—and angle distribution of the scattered electrons. The energy loss process is the primary interaction event. All further sources of analytic information, for example x-rays, Auger electrons, etc., are secondary products of the initial inelastic event. Therefore, EELS has a high potential information yield per inelastic scattering event. An EELS-spectrum contains features arising from the excitation of photons, plasmons, valence electrons and core electrons in the sample so that the spectrum is sensitive to chemical composition, electronic structure and coordination. The spectrum contains information about the chemical composition, the optical properties and the density of states. If an e-beam hits the sample, part of the electrons are scattered elastically and lose part of their energy. The composition of elements and the atomic bonding state may be determined by analyzing the energy using a spectroscope beyond the electron microscope by EELS. By selecting electrons with a specific loss energy using a slit for imaging the electrons a distribution of elements in the sample may be visualized. Coulomb interaction between the incident electrons and the electrons of the atoms causes inelastic scattering. The similarity of the mass of the incident electron and the target, that is the electron of the atom, results in a measureable energy exchange (a loss) which is typically in a range between several eV and hundreds of eV. A prominent form of inelastic scattering in condensed matter comprises the excitation of plasmons. This phenomenon arises from the fact that the electrons of the outer shell (conducting electrons in a metal, valiance electrons in a semi-conductor or isolator) are loosely bound to atoms, but they are coupled by electro static forces. Their quantum states are delocalized in the form of energy bands. When a fast moving electron propagates in condensed matter, the electrons of the atoms are repulsed by Coulomb interaction, leaving a correlation hole (a region with an extension of about 1 nm with a positive net potential), which is dragged after the electron. Assuming that the electron velocity exceeds the Fermi velocity, the response of the electrons of the atoms is oscillating, resulting in regions of alternating positive and negative spaced charge. When the electron is moving through condensed matter, the reverse attraction of the positive correlation hole causes an energy loss. The process may be considered with respect to a creation of pseudo particles called plasmons. In this context, the inelastic scattering is interpreted as a creation of a plasmon at each scattering event of the electron, resulting in an energy loss spectrum comprising a peak at an energy loss $E=E_p$ and multiples of this energy.

CELS may enable investigations of plasmons, plasmon-polaritons, structures and materials, in which the plasmons develop, in the sub-micron size scale. The method may have two modes of operation—probing mode and a visualization (imaging) mode—and accordingly different experimental configurations, working principles and outputs are delivered as a result of the measurement. All the techniques may be applied in a wide temperature range, from liquid He (helium) temperatures up to elevated temperatures (above room temperature). Time-resolved measurements may add additional information in both the probing and the imaging modes. Angular-resolved measurements may be applicable both in the probing and in the imaging mode.

Details on Plasmons and Plasmon-Polaritons and their Excitation

Plasmonics constitutes a major part of the field nanophotonics, which studies the interactions of electromagnetic fields with matter within dimensions smaller than the wavelength and accordingly the confinement of the fields over such dimensions. The theory of plasmonics is generally based on interactions of electromagnetic radiation with the conduction electrons of metals, more specifically—metallic interfaces and metallic nanostructures. Although there are already well-developed theories of plasmons in semiconductors and insulators, historically the plasmons have been discovered in metals. Further, the theory of plasmon development and propagation has been developed for metals. A major asset of plasmonics is the fact that it is founded on the classical physics, so that a solid knowledge of electromagnetism is sufficient to understand the major aspects of the plasmon theory. The other major asset is the experimental demonstrations showing how peculiar and sometimes unexpected behavior and phenomenon can take place if sub-wavelength structures are implemented in plasmonics studies even with materials, which are well-studied.

Interaction of Electromagnetic Radiation with the Electrons in Matter.

The interaction of electromagnetic field with the electrons of a material and more specifically, the interaction of light with the free electrons in metals can be fully described by the classical electrostatic theory, which is based on Maxwell equations [1-5]:

$$\nabla \cdot D = \rho \quad (1)$$

$$\nabla \cdot B = 0 \quad (2)$$

$$\nabla \times E = -\delta B/\delta t \quad (3)$$

$$\nabla \times H = J + \delta D/\delta t, \quad (4)$$

which relate macroscopic electric (the dielectric displacement D and electric field E) and magnetic (magnetic field H and magnetic induction B) fields to an external charge density $\rho$ and current density J.

In most cases, which are met in the applications and fundamental physics, the medium is linear, isotropic and non-magnetic. For such cases, two additional relations hold:

$$D = \varepsilon_0 E + P = \varepsilon_0 \varepsilon E \quad (5)$$

$$B = \mu_0 H \quad (6)$$

where $\varepsilon_0$—the dielectric constant of vacuum,
$\varepsilon$—the dielectric constant of the material,
$\mu_0$—the magnetic permeability of vacuum,
P—the (macroscopic) density of permanent and induced electric dipole moments in the material, called the polarization density.

In the media, $\varepsilon = \varepsilon(\omega)$ i.e. the dielectric constant is frequency dependent and is generally a complex function:

$$\varepsilon(\omega) = \varepsilon_r + i \cdot \varepsilon_i. \quad (7)$$

The real part of the dielectric function is responsible for the dispersion in the material and the imaginary part—for the absorption in the material.

The dielectric function is connected to the complex index of refraction of a material as $$\varepsilon(\omega) = n^2(\omega) \quad (8)$$

and $$n(\omega) = n_r + i \cdot n_i \quad (9)$$

It is then not difficult to show that $$\varepsilon_r(\omega) = n_r^2 - n_i^2 \qquad (10)$$

$$\varepsilon_i(\omega) = 2n_r n_i \qquad (11)$$

The absorption in a material is well described by the Lambert-Beer law stating that the intensity of a light beam traveling through a medium decreases with the distance as $$I(x) = I_0 e^{-\alpha x} \qquad (12)$$

where $\alpha = \alpha(\omega) =$ is the absorption coefficient of the medium.

Bulk Plasmons

The classical electromagnetism can successfully describe various properties of the materials using different models. One such model is the plasma model, which can describe many optical properties and phenomena in solids. This model describes also the plasmons and plasmon-polaritons in metals and highly doped semiconductors and is valid in a wide frequency range.

The electrons of the material, within this model, are treated collectively as electron gas of an effective electron mass m and density N. The electron gas can freely propagate through the material; the atoms are treated collectively as a positively charged backgroud.

In the presence of an external electromagnetic field $E(t) = E_0 \exp(-i\omega t)$, the electrons start to oscillate collectively with a characteristic frequency $\omega_{plas}$, the plasma frequency. The oscillations are damped through collisions with the background atoms with a characteristic collision rate $\gamma = 1/\tau$, where $\tau \approx 10^{14}$ sec at room temperature.

This collective oscillation of the electrons in a material is called plasmons.

Typical characteristics of these oscillations are their frequency, wave vector and dispersion relation. One can obtain these characteristics from the Maxwell equations and the equation of motion of plasmon:

$$m\ddot{x} + m\dot{x} = +eE(t) \qquad (13)$$

The solution of it is $$x(t) = E(t) \frac{e}{m(\omega^2 + i\gamma\omega)} \qquad (14)$$

The total polarization of the medium, which results from the displacement of the electrons relative to the atom cores, is $P = -Nex$.

One can estimate from here:

$$D = \varepsilon_0 E + P = \varepsilon_0 E - Nex = \varepsilon_0 (1 - Ne) E(t) \qquad (15)$$

The expression $Ne^2/\varepsilon_0 m$ is typically denoted as plasmon frequency i.e. $\omega_p^2 = N e^2/(\varepsilon_0 m)$.

The dielectric function of the material expressed via the plasmon frequency becomes:

$$\varepsilon(\omega) = 1 - \frac{\omega \beta}{\omega^2 + i\gamma\omega} \qquad (16)$$

If the collision rate $\gamma$ is expressed via the time between collisions $\gamma = 1/r$, then expression (14) is transformed into $$\varepsilon(\omega) = 1 - \frac{\omega_p^2 \tau^2}{\omega^2 \tau^2 + i\omega\tau} \qquad (17)$$

This expression is convenient because it is related to the damping rate/collision rate of the plasmon/plasmon-polariton, thus one can make different estimations.

At low frequencies $\omega\tau \ll 1$, metals are strongly absorbing. The absorption coefficient becomes $$\alpha(\omega) = \sqrt{\frac{2\omega_p^2 \omega \tau}{c^2}} \qquad (18)$$

The penetration depth of the fields at low frequencies is thus $\delta = \lambda/\alpha$ and is called skin depth.

At large frequencies $\omega\tau \gg 1$. The expression can be transformed into Taylor series as $$1 - \frac{\omega_p^2 \tau^2}{\omega^2 \tau^2 + i\tau\omega} \approx 1 - \frac{\omega_p^2}{\omega^2} * \frac{1}{1 + i\omega\tau} =$$

$$1 - \frac{\omega_p^2}{\omega^2}\left(1 - \frac{\tau}{\tau\omega} + \frac{\tau^2}{\tau^2\omega^2} - \ldots\right) \approx 1 - \frac{\omega_p^2}{\omega^2}$$

The dielectric constant is then $$\varepsilon(\omega) = 1 - \frac{\omega_p^2}{\omega^2} \qquad (19)$$

It means, the dielectric constant is approximately real. Then, one can derive the dispersion relation from here:

$$\omega(K) = \sqrt{\omega_p^2 + \frac{k^2}{c^2}} \qquad (20)$$

It is then easy to plot this dispersion relation, shown in FIG. 2.

The figure shows that all allowed frequency of the SPP are above the vacuum light line, which is $\omega = ck$. There is no propagation of electro-magnetic waves below the plasmon frequency $\omega < \omega_p$. For $\omega > \omega_p$ waves propagate with a group velocity $v_g = d\omega/dk < c$.

For the particular case $\omega = \omega_p$, it follows from (19) that $\varepsilon(\omega_p) = 0$. which means that the damping is very low.

At this frequency, a collective longitudinal excitation mode ($k \| E$) is formed, with a purely de-polarizing field ($E = (-1/E_0)P$). The physical interpretation is a collective oscillation of the electron gas with respect to the fixed background of positive atom cores. The quanta of this charge oscillation are called bulk plasmons. As these are longitudinal waves, bulk plasmons cannot couple to transversal electro-magnetic fields and thus cannot be excited from or strayed to direct irradiation. In most metals, the plasma frequency is in the ultra-violet regime, with energies within 5-15 eV, depending on the metal band structure.

Surface Plasmons

The bulk plasmons, discussed in the previous section, are generally collective oscillations of the electrons in the bulk of the material. Their properties depend strongly on the material, in which the plasmons are induced.

Surface plasmons (or more exactly surface plasmon-polaritons, SPPs), on the other hand, are electro-magnetic excitations that propagate along the interface between a metal and a dielectric medium.

In a similar manner, as for the bulk plasmons, the derivation of the relations describing the behavior of the surface plasmons is based on the Maxwell equations.

Figure 23A:
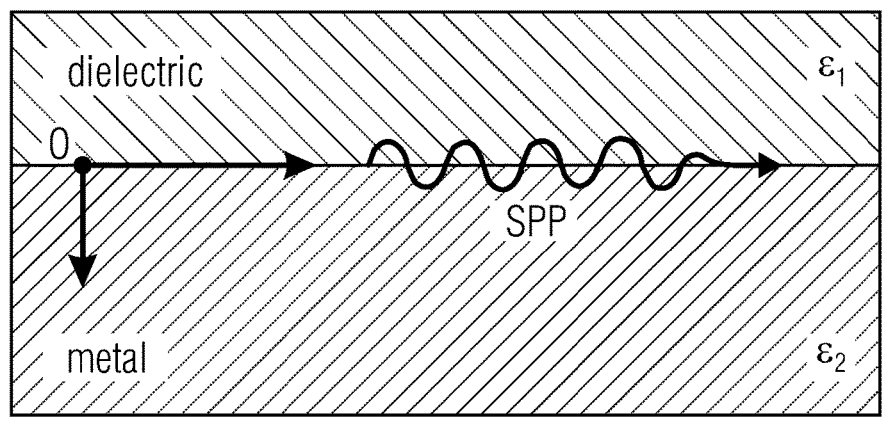
FIG. 23A shows an example of a metal/dielectric interface.
Figure 23A:
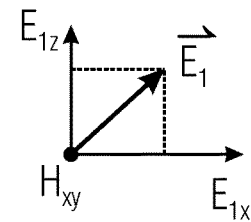

For the derivation of these, we again start with Maxwell's equations, which have to be separately solved for the metal and dielectric media, that form the interface. Finally, they are related to each other by the conditions of continuity and of the fields at physical boundaries. FIG. 23A shows an example of such a metal dielectric interface.

The conditions for continuity of the normal and transversal field components on this interface are:

$$D_{1,z}=D_{2,z}, B_{1,z}=B_{2,z} \tag{21}$$

$$E_{1,x/y}=E_{2,x/y}, H_{1,x/y}=H_{2,x/y} \tag{22}$$

The indices (1) and (2) indicate the dielectric and metal medium.

From (21), (22) and the Maxwell equations (1)-(4), it is easy to show that transverse-electric (TE) modes do not exist.

For the propagating along Ox transverse-magnetic modes (TM), the field components are as follows:

$$E_i=(E_{ix},0,E_i)e^{i(k_i \cdot r - \omega t)} \tag{23}$$

$$H_i=(0,Hi,y,0)e^{i(k_i \cdot r - \omega t)} \tag{24}$$

$$D_i=\varepsilon_0\varepsilon_i E_i \text{ and } B_i=\mu_0 H_i \tag{25}$$

The wave vector of the propagating TM mode is $k_i=(k_x, 0, k_{i,z})$. In analogy to the theory of light propagation in solids, the wave vector along the waveguide layer is denoted as $\beta$ i.e. $\beta=k_x$, where $\beta=k_x$ indicates the propagation constant along x.

Using the conditions of continuity (21) and (22) and the Maxwell's equation (1) and (4) in absence of charges and currents ($\rho=0$, $J=0$), it follows that we obtain the following relations between the ki,z components:

$$\frac{k_{1,z}}{\varepsilon_1} = \frac{k_{2,z}}{\varepsilon_2} \tag{25}$$

The TM modes are the supported modes. They are bound to the interface and propagate along the interface. That is why, the field in $O_z$ direction is to have imaginary component or in other words the wave vector $k_{i,z}$ is to be imaginary of opposite sign:

$$k_{1,z}=+i\kappa_1 \text{ and } k_{1,z}=-i\kappa_1 \tag{26}$$

Figure 23B:
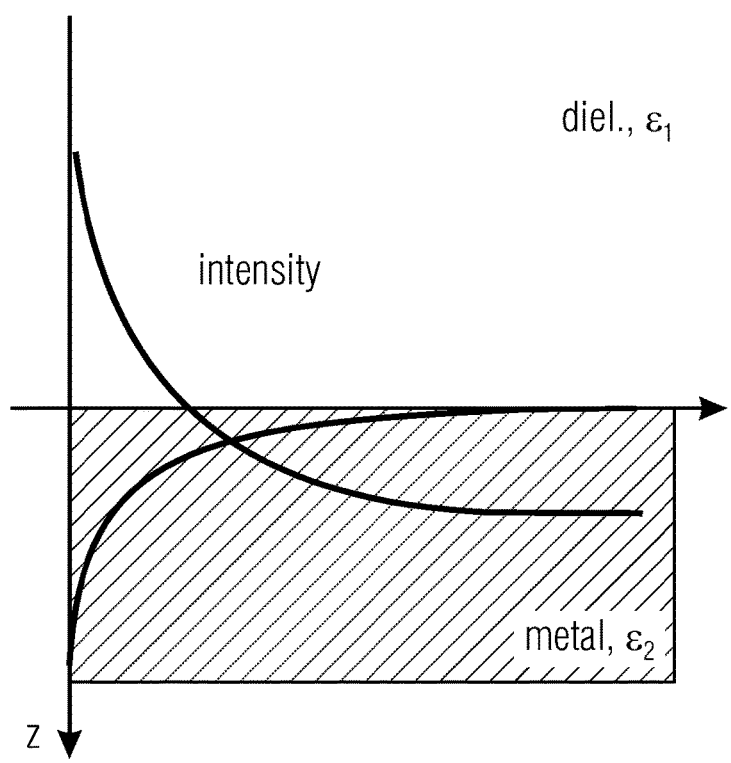
FIG. 23B illustrates an example of evanescent field components of a plasmon.

In this way, the fields decay exponentially into the respective half spaces: $Ei \propto \exp(\pm iki,z)=\exp(\pm \kappa_{i,z})$ (FIG. 23B). (25) and (26) can be fulfilled only, if the dielectric constants of the two materials are of opposite sign (i.e. $\varepsilon_1=-\varepsilon_2$). FIG. 23B illustrates an example of evanescent field components of a plasmon in two half spaces.

Hence, the surface plasmon is composed of an electromagnetic wave in the dielectric medium and an oscillating electron plasma in the metal, where both components have an exponentially decaying evanescent character in direction normal to the interface. Due to this composed character, surface plasmons are also referred to as surface plasmon-polaritons. The penetration depth of the field into the dielectric is typically on the order of $\lambda/2$ of the wavelength in the medium, whereas in the metal it is characteristically given by the skin depth.

Figure 24A:
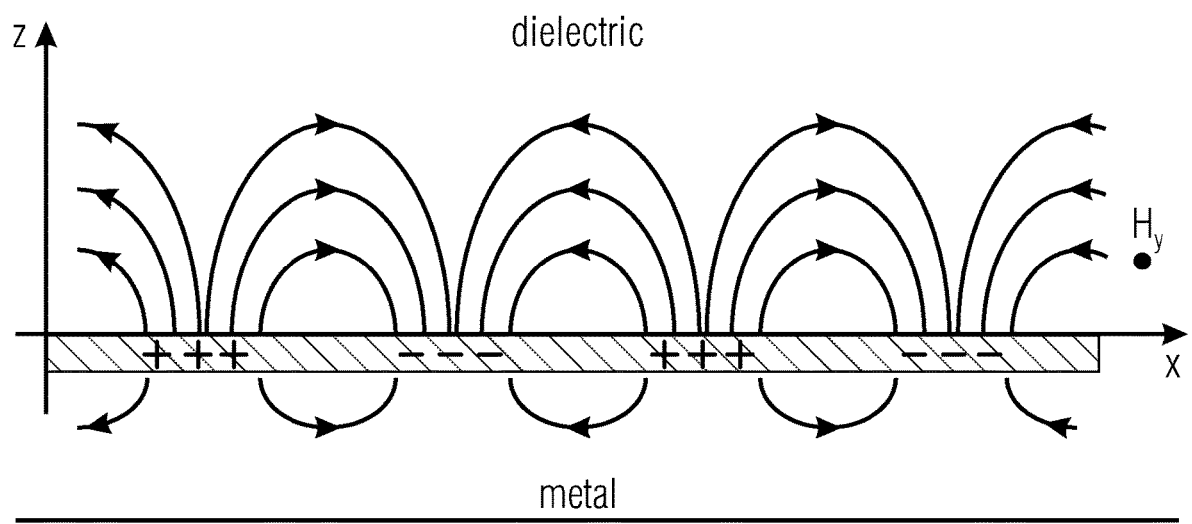
FIG. 24A illustrates an example of a composed character of a surface plasmon-polariton at an interface between dielectric and metal.
Figure 24B:
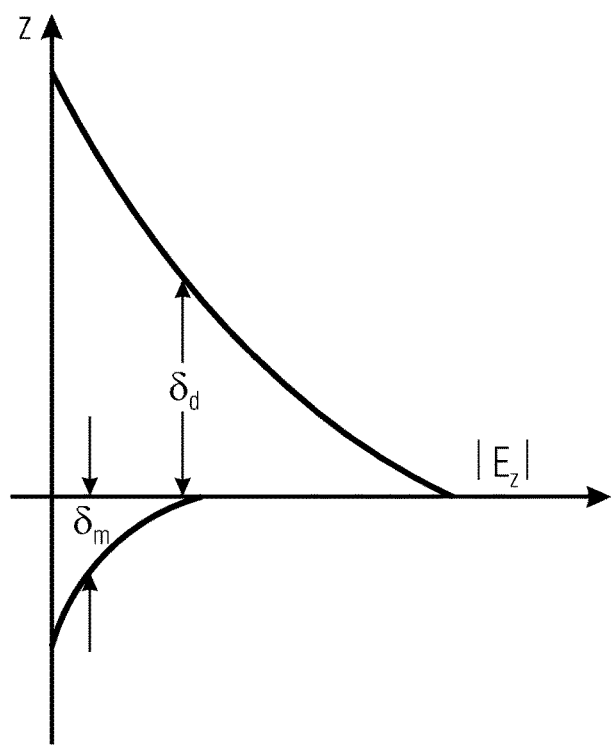
FIG. 24B illustrates an example of evanescent fields in two half spaces.

FIG. 24A illustrates a composed character of SPPs at the interface between dielectric and metal. FIG. 24B illustrates evanescent fields in the two half spaces [9].

The dispersion relations for surface plasmons is derived from eq. (25) using the expression $$|k_1|^2=\varepsilon_1 k_0^2=\beta^2+k_{1,z}^2=\beta^2-\kappa_1^2 \tag{27}$$

$$|k_2|^2=\varepsilon_2 k_0^2=\beta^2+k_{2,z}^2=\beta^2-\kappa_2^2 \tag{28}$$

where, $k_0=\omega/c$ is the vacuum wave vector of a photon with frequency $\omega$.

Equations (27) and (28) together with eq. (25) lead to $$\beta = \frac{\omega}{c}\sqrt{\frac{\varepsilon_1 \varepsilon_2}{\varepsilon_1 + \varepsilon_2}} \tag{29}$$

It can be seen that the SPP dispersion relation completely resides below the light cones, while a crossing only occurs in the limit $\omega=0$, $\beta=0$. SPPs thus cannot be excited by direct illumination of light, as energy and momentum conservation ($\omega_{light}=\omega_{SPP}$ and $k_{light}=k_{SPP}$) cannot be fulfilled at the same time. Instead, in order to excite SPPs, a momentum transfer has to take place. This can be achieved by several excitation techniques discussed below.

FIG. 3 shows an exemplary dispersion relation for surface plasmon-polaritons.

In the above discussion we have not yet considered the complex nature of the dielectric constant of metal.

The imaginary part of the dielectric constant causes Ohmic damping of the electron oscillations in the metal. From eq. (29), one sees that the propagation constant also becomes imaginary, $\beta=\beta_{re}+i\beta_{im}$. As a consequence, in the solutions for the SPPs, eq. (23), an exponentially decaying damping term $\exp(-\beta x)$, which leads to a characteristic propagation length of SPPs is given by the following eq. (30)

$$\delta_{SP}=1/(2Im(\beta)) \tag{30}$$

These typically range within a few micrometers at visible wavelength and up to 100 μm in the infrared.

This situation becomes different in case of metal films (thickness d) with two inter-faces to dielectric substrates. In the case of a thick metal film on a dielectric substrate two independent SPP modes exist related to different dielectric constants of the media adjacent to metal interfaces. These modes will degenerate if the film is in a symmetrical environment. If a metal film is thin enough so that the electromagnetic interaction between the interfaces cannot be neglected, the SPP dispersion is significantly modified and coupling between SPP modes on different interfaces of the film has to be considered. The interaction of SPP modes removes the degeneracy of the spectrum and the surface plasmon frequencies split into two branches corresponding to symmetric (low-frequency mode) and antisymmetric (high-frequency mode) field distributions through the film. For large SPP wave vectors these modes can be estimated from $$\omega\pm=\omega_{SP} 1\pm\exp(-\beta d) \tag{31}$$

At the same time, for such thin metal films, the imaginary part of the wave vector determining the propagation length of high-frequency SPP modes decreases as $\alpha^2$ with the film thickness. This leads to a very long propagation length of such SPP modes, called the long-range SPPs. These modes can have propagation lengths up to centimeters in the infrared regime.

Excitation of Plasmon-Polaritons

The SPP dispersion curve lies entirely below that of free space light in the dielectric, such that β>k. It follows that direct excitation of SPPs by light beams is not possible unless special techniques to achieve phase matching are employed.

Prism Coupling

Prism coupling is the easiest method to excite SPP in a thin metal layer. It invokes coupling of the incident electromagnetic field to the SPP developing in the metal layer. The wave vector of the incident photon is smaller than the wave vector of the SPP in the metal layer. In order to excite the SPP by a photon, their wave vector is to match in magnitude and direction.

The prism, due to its high refractive index, increases the wave vector of the incident photon when propagating within the medium of the prism. By varying the angle of incidence of the photon on the prism, both the magnitude and the direction of the wave vector is varied. Beyond a certain angle (the critical angle $\theta_c$), the light propagating in the prism has the evanescent tail in order "to tunnel" into the layer beyond the prism and since the wave vector can match the one of the SPP, the plasmon-polariton is excited. FIGS. 4, 5 shows a possible prism coupling configuration and the signal at the detector derived from prism coupling experiment.

The upper panel of FIG. 25 shows an exemplary dispersion 2503 of the SP compared to the dispersions 2501, 2502 of the light in vacuum and in a prism with a dielectric constant of $\varepsilon_0 > 1$, respectively. The lower left panel of FIG. 25 illustrates an example of a prism coupling configuration, similar to FIG. 4. The lower right panel of FIG. 25 shows an example of a signal at the detector from a prism coupling experiment, similar to FIG. 5. For the description of the lower panels of FIG. 25, reference is made to the description of FIG. 4 and FIG. 5.

In the coupling process, the wave vector component of the light parallel to the metal layer is coupled to the wave vector of the SPP:

$$\beta = \frac{\omega}{c}\sqrt{\varepsilon_{prism}}\sin\theta \tag{32}$$

The signal at detector represents the reflectivity at the interface prism/sample. Below the critical angle, all the light is reflected at the interface and goes to the detector. At the critical angle, almost all the light is coupled into the SPP because the efficiency of the prism coupling is practically 100%. At this coupling angle, the signal at the detector is zero. After the coupling angle, the light is reflected again toward the detector and high intensity signal is detected again. The minimum of the signal is typically sharp because the coupling angle is very narrow.

Examples of prism coupling configurations are the prism coupling methods according to Otto or Kretschmann. Both methods use total reflection for creating an evanescent wave, as well as the difference of the velocity of light within two different dielectrics. The prism coupling may be described as a three-layer configuration, two dielectric media with a different permittivity $Y_d$ and the metal layer with the permittivity $Y_m$. The surface plasmon is excited at the interface between the dielectric with the lower permittivity and the metal. The dielectric with the higher permittivity is used for increasing the momentum of the incident light that may excite the surface plasmon. In the Otto configuration, the dielectric with the higher permittivity is used as a first layer, the dielectric with the lower permittivity is located between the metal and the first layer. In the Kretschmann configuration, the metal layer and the middle layer are reversed. An inner total reflection occurs if a critical angle of incidents $\Delta_{crit}$ between the dielectric media is exceeded. At the interface and evanescent field occurs and the light is reflected. In the Otto configuration the distance between the first layer and the metal layer has to be small enough so that the extension of the evanescent field may reach the metal layer. In the Kretschmann configuration the middle metal layer has to be small enough for keeping a damping of the light within an acceptable regime. The momentum of the evanescent field is suitable for exciting the surface plasma. FIG. 9 illustrates the excitation mechanism for the Otto configuration. A prism or a half cylinder may be needed for realizing the internal total reflection. In FIG. 10, the reflectance is shown as a function of the incident angle Θ. The dashed line indicates the two-layer system and the solid line indicates the plasmon resonance given by equation 32.

Grating Coupling

The wave vector of the incident photons can be matched to the wave vector of the in-plane propagating plasmons by using a diffraction grating on the surface of the metal layer. The effect has been long used in photonics for coupling of incident photons to the guided modes of a waveguide [6].

The incident light beam is diffracted on the grating so that the wave vector component kx of the incident photon parallel to the metal layer becomes kx=k sin θ and is matched to the propagating constant of the SPP in the metal layer β as $$\beta = k \sin\theta \pm nG \tag{33}$$

via the period ∧ of the grating (called also lattice constant). Here, G=2π/∧ is the reciprocal lattice constant and n=1, 2, 3, . . . .

The excitation of the SPPs is detected as intensity minimum of the signal at the detector. FIG. 6 shows an example of grating coupling of light with wave vector k impinging on a metal grating surface of period ∧. The reverse process can also take place, when SPPs propagating along a modulated surface can couple to light and thus radiate.

Excitation by Focused Optical Beams

Excitation by focused optical beams through a microscope objective, from the point of view of the physics, is an alternative to the prism coupling [7].

A light beam is passed through a microscope objective with very high numerical aperture (NA). The tip of the objective is brought in the proximity of the sample and immersed into refractive-index-matching immersion oil. The substrate of the metal layer should be glass. The oil droplet is placed on the glass substrate, on the side opposite to the metal film. The light then excites the SPP through the glass substrate.

The high NA of the objective ensures a large angular spread of the focused light beam, including angles $\theta > \theta_c$ greater than the critical angle for total internal reflection after exiting the objective. Thus, wave vectors $k_x = \beta$ are available for phase-matching to SPPs at the metal/air interface. Furthermore the off-axis propagation of the light through the objective provides such a distribution of the beam's intensity and exit angles that most of the diffracted light (exiting the objective) is around the $\theta_{SPP}$, which reduces the amount of directly transmitted and reflected light.

The technique is useful when excitation of continuum of SPPs of different energies is wanted. The highly focused beam also allows for localized excitation within the diffraction limit. FIG. 7 shows a typical setup of excitation of SPP by white-light beam through an off-axis microscope objective and index-matching immersion oil droplet.

Near-Field Excitation

Another technique for excitation of SPP is related to near-field optical microscopy. The technique uses a fiber taper with SNOM to focus light on a sub-wavelength spot of the surface of a metal. In that, circular SPP waves are local excited and propagate radially from the spot [8].

This configuration can be treated theoretically as either a diffraction or tunneling mechanism of the SPP excitation. The technique has two distinct advantages—i) the SPP can be excite locally with sub-wavelength resolution and ii) surface roughness on the SPP propagation and the scattering at individual surface defects can be studied with high spatial resolution.

Thus, on the one hand the excitation of the SPP occurs as a coupling of the diffracted light from the sub-wavelength fiber taper aperture into the propagating SPP. On the other hand, the excitation occurs as a generation of evanescent field at the fiber taper tip. Thus, a photon tunneling takes place from the fiber aperture into the metal surface. (this is an analogue to the prism coupling technique).

FIG. 8 shows an example of a principle of the detection of SPPs (excited via the prism) with a SNOM probe.

In general, plasmons may be applicable in various applications. For example, a position and intensity of the plasmon absorption and a emission peak. For example, a position and intensity of a plasmon/-polariton absorption and an emission peak may depend on a molecular adsorption which may be applied in molecular sensors. Further, plasmons may be applied as a means for transmitting information in computer chips, as plasmon/-polariton may support much higher frequencies, for example, in the 100 THz regime, while common wires cause high losses in a regime of 10 GHz. However, for plasmon based electronics being applicable, a plasmon based amplifier analog to the transistor, called "plasmonster", may be needed. Due to their extremely small wavelength, plasmons may also be applied as a means for highly resolved lithography and microscopy. Surface plasmons comprise the unique capability to confine light on an extremely small scale, facilitating many new applications. Surface plasmon/-polaritons may be very sensitive with respect to properties of the material on which they are propagating. Thus, surface plasmon/-polaritons may facilitate a measurement of a thickness of monolayers of colloid films. Further, plasmons may improve the efficiency of organic light emitting diodes. Plasmons may contribute to an improvement of an efficiency and a cost efficiency of solar cells by an application of metallic nanostructures exploiting plasmonic effects, which may improve an absorption of light in various kinds of solar cells: crystalline silicon, III-V semiconductors, organic high power materials and color sensitive materials. For plasmonic photovoltaic devices working perfectly, ultrathin, transparent, conducting oxides may be needed. Further, plasmonic structures may be applied for sensor applications, which may, for example, be used for highly sensitive CO, or $CO_2$-gases. For example, plasmons may be used as plasmonic converters, plasmonic waveguides and plasmon based radiation sources, for example, for heat assisted magnetic recording. Plasmons may be applied in plasmon based modulators, Kerb-filters, polarizers, photodetectors in the mid-infrared and vibration spectroscopy in the mid-infrared. Plasmons may enable a miniaturization of components like chips, transistors, interconnects, multiplexers, detectors.

For example, the measurement system 100 may be applied in the fields of biology and life science, comprising cryobiology, geology, pharmaceutical science, electron tomography, particle analysis, particle recognition, protein localization, structural biology, texture imaging, toxicology, virology. Further, the concept may be applied in the semiconductor industry and for data storage, for example, in the manufacturing of semiconductor materials, and devices such as printed circuit boards, computer chips, liquid crystal displays, mobile phones and data storage devices. Further, the concept may be applied in material science, for example, in device testing and characterization, dynamic material experiments, electron beam assisted deposition, material qualification, medical research, nanometrology, and nano-prototyping. Also, the concept may be applied in the industry, for example, in chemical and petrochemical industry, in direct beam writing manufacturing, metallurgical industry, manufacturing of metal components, nutrition science, forensics, fractography, microcharacterization, and mining.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples need more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Heinz Raether, Excitation of Plasmons and Interband Transitions by Electrons, Springer Tracts in Modern Physics, Vol. 88, Springer Berlin 1980.
[2] Heinz Raether, Surface Plasmons on Smooth and Rough Surfaces and on Gratings, Springer Tracts in Modern Physics, Vol. 111, Springer Berlin 1988.
[3] Stefan Meier, Plasmonics: Fundamentals and Applications, Springer, 2007.
[4] A. Zayats, I. Smolyaninov, Journal of Optics A: Pure and Applied Optics 5, S16 (2003), overview article.
[5] A. Zayats, et. al., Physics Reports 408, 131-414 (2005), overview article.
[6] A. Yariv, P. Yeh, Optical Waves in Crystals, John Wiley & Sons, 1983.
[7] Bouhelier, Wiederrecht, Opt. Left. 30, 884 (2005).
[8] Krenn, Aussenegg, Physik Journal 1, 39 (2002).
[9] Barnes et al., Nature 424, 82

The invention claimed is:

1. Measurement system for obtaining information about a sample, the measurement system comprising:
    an excitation-beam source configured for irradiating the sample with an excitation-beam,
    a probe unit configured for exposing the sample to a probing radiation or a probing field,
    a detection unit configured for
        obtaining a first information about an interaction of the probing radiation or the probing field with the sample, if a plasmon or plasmon-polariton was excited by the excitation-beam,
        obtaining a second information about an interaction of the probing radiation or the probing field with the sample, if a plasmon or plasmon-polariton was not excited by the excitation-beam.
2. Measurement system according to claim 1,
    wherein the excitation-beam source is configured for irradiating the sample with the excitation-beam so as to excite a plasmon or plasmon-polariton in the sample.
3. Measurement system according to claim 1,
    wherein the excitation-beam source comprises an e-beam source configured for irradiating the sample with an e-beam.
4. Measurement system according to claim 1,
    wherein the excitation-beam comprises an electromagnetic radiation, and
    wherein the excitation-beam source is configured for irradiating a coupling element arranged adjacent to the sample so as to irradiate the sample with the excitation-beam.
5. Measurement system according to claim 1,
    wherein the measurement system is configured for simultaneously irradiating the sample with the excitation-beam and exposing the sample to the probing radiation or the probing field.
6. Measurement system according to claim 1,
    wherein the measurement system further comprises an analyzer configured to obtain the information about the sample based on an information about an interaction of the probing radiation or the probing field with the sample.

7. Measurement system according to claim 5,
wherein the excitation-beam is configured for exciting the sample from a ground state to an excited state,
wherein the detection unit is configured for obtaining
the first information about an interaction of the probing radiation or the probing field with the sample while the sample is in the excited state, and
the second information about an interaction of the probing radiation or the probing field with the sample while the sample is in the ground state, and
wherein the analyzer is configured for comparing the first information to the second information to obtain the information about the sample.

8. Measurement system according to claim 1,
wherein the measurement system is configured for adapting a position of an excitation spot and/or a detection spot relatively to the sample,
wherein the excitation spot is a surface region of the sample which is to be irradiated with the excitation-beam, and
wherein the detection spot is a surface region of the sample which is to be exposed to the probing radiation or the probing field,
wherein the detection unit is configured for obtaining the first and/or the second information about the interaction in dependence on the position of the excitation spot and/or the detection spot.

9. Measurement system according to claim 8,
wherein the analyzer is configured for obtaining a spatial image of an excited plasmon or plasmon-polariton based on a plurality of measurements of an information about an interaction of the probing radiation or the probing field with the sample,
wherein the plurality of measurements of the information about the interaction is obtained from a plurality of relative positions of the excitation spot and the detection spot.

10. Measurement system according to claim 1,
wherein the measurement system comprises a manipulation field source configured for exposing the sample to an electromagnetic manipulation field,
wherein the detection unit is configured for obtaining an information about an interaction of the probing radiation or the probing field with the sample in dependence on the manipulation field.

11. Measurement system according to claim 1,
wherein the measurement system is configured for adapting an angle between the excitation-beam and a main surface region of the sample.

12. Measurement system according to claim 1,
wherein the probing radiation or the probing field comprise one of
an electromagnetic radiation,
an electromagnetic field,
an electrostatic field,
an e-beam.

13. Measurement system according to claim 1,
wherein the measurement system comprises a photodetector configured for detecting a transmitted, reflected, emitted and/or scattered electromagnetic radiation from the sample.

14. Measurement system according to claim 1,
wherein the detection unit comprises a receiver unit configured for receiving an electromagnetic radiation or an electromagnetic field,
wherein the electromagnetic radiation or the electromagnetic field are based on the electromagnetic radiation or the electromagnetic field emitted by the probe unit.

15. Measurement system according to claim 1,
wherein the detection unit is configured for detecting a modification of a magnetic field by the sample.

16. Measurement system according to claim 1,
wherein the measurement system comprises an electron detection unit, and
wherein the electron detection unit is configured for detecting electrons scattered and/or emitted by the sample.

17. Measurement system according to claim 1,
wherein the probe unit is configured for applying an electrostatic potential between a conductive tip and the sample for providing the probing field,
wherein the detection unit is configured for detecting a current between the conductive tip and the sample.

18. Method for obtaining an information about a sample, the method comprising:
irradiating the sample with an excitation-beam,
exposing the sample to a probing radiation or a probing field,
obtaining a first information about an interaction of the probing radiation or the probing field with the sample, if a plasmon or plasmon-polariton was excited by the excitation-beam,
obtaining a second information about an interaction of the probing radiation or the probing field with the sample, if a plasmon or plasmon-polariton was not excited by the excitation-beam.

* * * * *